United States Patent
Diamond et al.

(10) Patent No.: US 10,127,457 B2
(45) Date of Patent: Nov. 13, 2018

(54) SYSTEM AND METHODS FOR GENERATING QUALITY, VERIFIED, AND SYNTHESIZED INFORMATION

(71) Applicant: Remote Sensing Metrics, LLC, Chicago, IL (US)

(72) Inventors: Alex H. Diamond, Buena Vista, CO (US); Thomas Peter Diamond, Chicago, IL (US)

(73) Assignee: Remote Sensing Metrics, LLC, Chicago, IL (US)

( * ) Notice: Subject to any disclaimer, the term of this patent is extended or adjusted under 35 U.S.C. 154(b) by 0 days.

(21) Appl. No.: 15/362,097

(22) Filed: Nov. 28, 2016

(65) Prior Publication Data

US 2017/0076158 A1    Mar. 16, 2017

Related U.S. Application Data

(63) Continuation of application No. 14/215,954, filed on Mar. 17, 2014, now Pat. No. 9,542,627.
(Continued)

(51) Int. Cl.
*G06K 9/00* (2006.01)
*G06K 9/62* (2006.01)
(Continued)

(52) U.S. Cl.
CPC ..... *G06K 9/00785* (2013.01); *G06K 9/00637* (2013.01); *G06K 9/6298* (2013.01);
(Continued)

(58) Field of Classification Search
None
See application file for complete search history.

(56) References Cited

U.S. PATENT DOCUMENTS

| | | |
|---|---|---|
| 6,178,253 B1 | 1/2001 | Hendrickson et al. |
| 6,421,610 B1 | 7/2002 | Carroll et al. |

(Continued)

FOREIGN PATENT DOCUMENTS

| | | |
|---|---|---|
| DE | 1982820 A1 | 12/1999 |
| EP | 2529610 A1 | 12/2012 |

(Continued)

OTHER PUBLICATIONS

Murni, S. U., et al. "Risk mapping of malnutrition distribution using remote sensing and geoinformation system (GIS) in Tumpat, North of Kelantan, Malaysia." Proceedings, 4th Annual International Conference & Exhibition on Geographical Information Technology & Application (Map Asia 2005). 2005.*

(Continued)

*Primary Examiner* — Andrae S Allison
(74) *Attorney, Agent, or Firm* — Valauskas Corder LLC

(57) ABSTRACT

An improved system and methods for identifying, assessing, obtaining, evaluating, processing and displaying information about specific topics of interest. In certain embodiments, information is processed with advanced computation and analytical techniques in which detailed statistical data is generated and refined to produce meaningful quantitative and qualitative information that may be useful in analyzing the economic performance of specific businesses or geographical regions of interest.

20 Claims, 18 Drawing Sheets

Related U.S. Application Data

(60) Provisional application No. 61/799,816, filed on Mar. 15, 2013.

(51) Int. Cl.
*G06Q 30/02* (2012.01)
*G06T 7/00* (2017.01)
*H04N 1/00* (2006.01)
*H04N 5/76* (2006.01)
*H04N 7/18* (2006.01)

(52) U.S. Cl.
CPC ....... *G06Q 30/0201* (2013.01); *G06T 7/0022* (2013.01); *H04N 1/00209* (2013.01); *H04N 5/76* (2013.01); *H04N 7/183* (2013.01); *G06T 2207/30184* (2013.01); *G06T 2207/30242* (2013.01); *H04N 2201/0008* (2013.01)

(56) References Cited

U.S. PATENT DOCUMENTS

| | | | |
|---|---|---|---|
| 6,501,857 B1* | 12/2002 | Gotsman | G06F 17/30247 382/115 |
| 7,068,816 B1* | 6/2006 | Knoblauch | A01B 79/005 348/144 |
| 7,092,957 B2 | 8/2006 | Klein | |
| 7,171,389 B2 | 1/2007 | Harrison | |
| 7,536,025 B2 | 5/2009 | Folchetti et al. | |
| 7,660,430 B2 | 2/2010 | Navulur et al. | |
| 7,940,959 B2 | 5/2011 | Rubenstein | |
| 8,326,536 B1* | 12/2012 | Hoff | H02S 10/00 702/1 |
| 8,341,110 B2 | 12/2012 | Dalton | |
| 8,379,913 B1 | 2/2013 | Robinson et al. | |
| 8,411,903 B2* | 4/2013 | Paris | G06T 11/00 345/589 |
| 8,649,567 B1 | 2/2014 | Maltby | |
| 9,105,128 B2 | 8/2015 | Robinson et al. | |
| 9,542,627 B2* | 1/2017 | Diamond | G06K 9/6298 |
| 2003/0026485 A1 | 2/2003 | Gotsman et al. | |
| 2003/0040971 A1* | 2/2003 | Freedenberg | G06Q 30/06 705/26.3 |
| 2003/0044085 A1 | 3/2003 | Dial et al. | |
| 2004/0117777 A1 | 6/2004 | Lichana | |
| 2004/0260513 A1* | 12/2004 | Fitzpatrick | G06Q 10/06 702/182 |
| 2005/0162515 A1* | 7/2005 | Venetianer | G06F 17/3079 348/143 |
| 2005/0222829 A1* | 10/2005 | Dumas | G06Q 10/00 703/2 |
| 2005/0288957 A1* | 12/2005 | Eraker | G06Q 30/00 345/630 |
| 2006/0089842 A1 | 4/2006 | Medawar | |
| 2006/0136126 A1 | 6/2006 | Coombes et al. | |
| 2006/0294062 A1 | 12/2006 | Folchetti et al. | |
| 2007/0180131 A1 | 8/2007 | Goldstein et al. | |
| 2009/0005968 A1* | 1/2009 | Vengroff | G06F 17/3087 701/425 |
| 2009/0187575 A1* | 7/2009 | DaCosta | G06Q 30/06 |
| 2009/0257620 A1 | 10/2009 | Hicks et al. | |
| 2009/0285487 A1 | 11/2009 | Knoblock et al. | |
| 2011/0007094 A1 | 1/2011 | Nash et al. | |
| 2011/0191284 A1* | 8/2011 | Dalton | G06N 5/02 706/58 |
| 2011/0288895 A1 | 11/2011 | Perez, Jr. et al. | |
| 2011/0295575 A1 | 12/2011 | Levine et al. | |
| 2012/0269395 A1 | 10/2012 | Coulter et al. | |
| 2012/0274482 A1 | 11/2012 | Chen et al. | |
| 2013/0050517 A1 | 2/2013 | Fan et al. | |

FOREIGN PATENT DOCUMENTS

| | | | |
|---|---|---|---|
| JP | 2008152810 A | | 7/2008 |
| JP | 2008257488 A | | 10/2008 |
| KR | 20050096853 A | | 10/2005 |
| WO | 2009129496 A2 | | 10/2009 |
| WO | 2011079324 A2 | | 6/2011 |
| WO | 2013032823 A1 | | 3/2013 |

OTHER PUBLICATIONS

Nsoesie et al, Monitoring Disease Trends using Hospital Traffic Data from High Resolution Satellite Imagery: A Feasibility Study, Mar. 13, 2015, http://www.ncbi.nlm.nih.gov/pmc/articles/PMC4357853/.*

Doll et al., Mapping regional economic activity from night-time light satellite imagery, Ecological Economics 57 (2006) 75-92.*

Javers, E., "New Big Brother: Market-Moving Satellite Images", Aug. 16, 2016, http://www.cnbc.com/id/38722872.*

Wergeles, F. Commercial Satellite Imagery. (Apr. 1998). Retrieved from SCIP Strategic and Competitive Intelligence Professionals: http://www.scip.org/Publications/CIMArticleDetail.cfm?ItemNumber=1318.

Gannes, L. Parking Lots Help Predict Earnings. (Aug. 18, 2010). Retrieved from GIGOM: http://gigaom.com/2010/08/18/parking-lots-help-predict-earnings/.

Blanco, A.Satellite Imagery as Alternative Research for Investors. (Oct. 27, 2011). Retrieved from Integrity Research Associates: http://www.integrity-research.com/cms/2011/10/27/satellite-imagery-as-alternative-research-for-investors/.

Luccio, M. Business Uses of Satellite Imagery. (2012). Retrieved from Imaging Notes: http://www.imagingnotes.com/go/articleJ.php?mp_id=311.

Clark, E. Satellite Imagery Used for Sales Lead Generation. (Sep. 19, 2007). Retrieved from Gizmag: http://www.gizmag.com/go/8063/.

Imaging to Drive Remote Sensing Satellite Market. (May 31, 2012). Retrieved from optics.org: http://optics.org/news/3/5/43.

Kouchoukos, N. Globall Agricultural Production Estimates from Advanced Image Analysis. (2011). Retrieved from Lanworth: http://www.commoditymkts.org/Documents/NK%20Lanworth.pdf.

Satellite Imagery: Elevating Insight Three Powerful Ways GeoEye Introduces New Information Services Business Line. (2010). Retrieved from EIJ Earth Imaging Journal: http://eijournal.com/2010/satellite-imagery-elevating-insight-three-powerful-ways-geoeye-introduces-new-information-services-business-line.

Jin Chen, Soundararajan, G., Mihailescu, M., Amza, C., "Outlier Detection for Fine-grained Balancing in Database Clusters," in Data Engineering Workshop, 2007 IEEE 23rd International Conference on, vol., No., pp. 404-413, Apr. 17-20, 2007.

Nsoesie et al., Monitoring Disease Trends using Hospital Traffic Data from High Resolution Satellite Imagery: A Feasibility Study, Mar. 13, 2015, http://www.ncbi.nlm.nih.gov/pmc/articles/PMN4357853/.

Javers, E., New Big Brother: Market-Moving satellite Images, Aug. 16, 2016, http://www.cnbc.com/id/38722872.

Morency et al., Identification of the minimum size of the shared-car fleet required to satisfy car-driving trips in Montreal, Transportation (2015) 42:435-447.

* cited by examiner

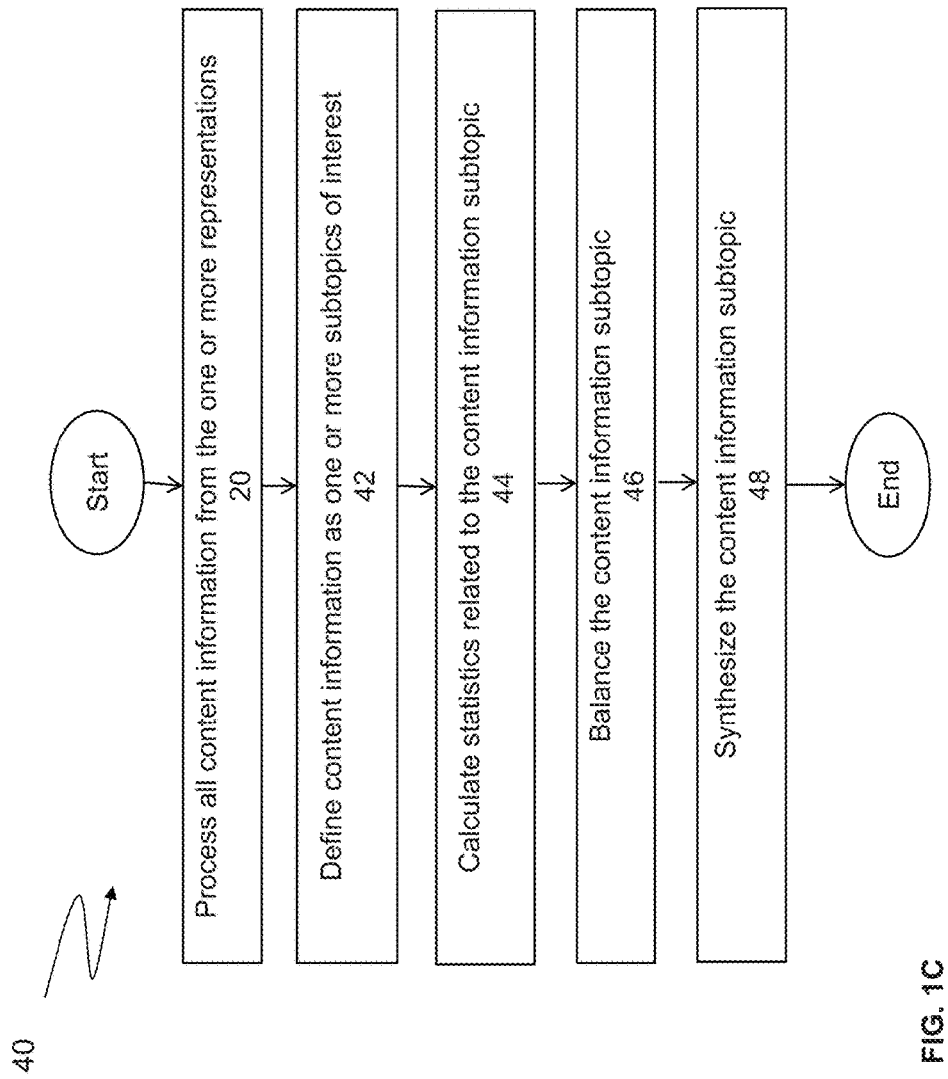

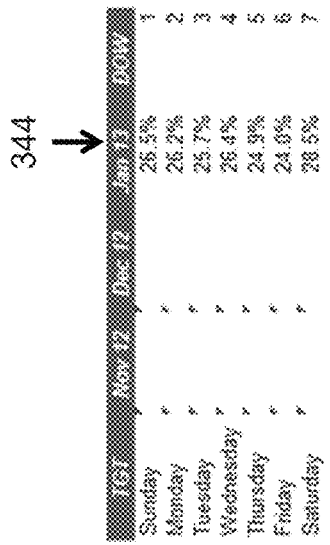
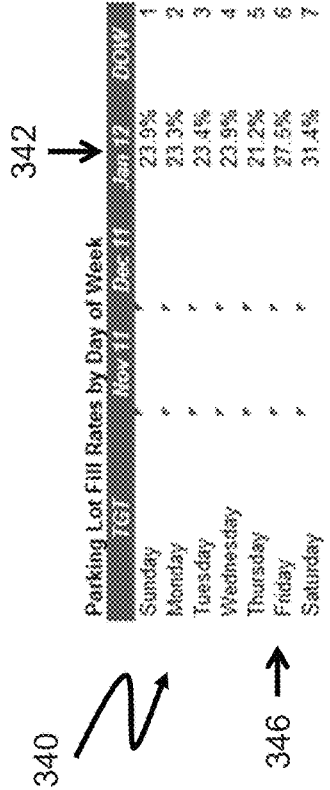
FIG. 3D
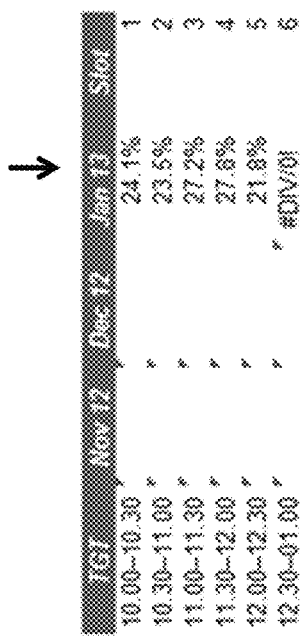
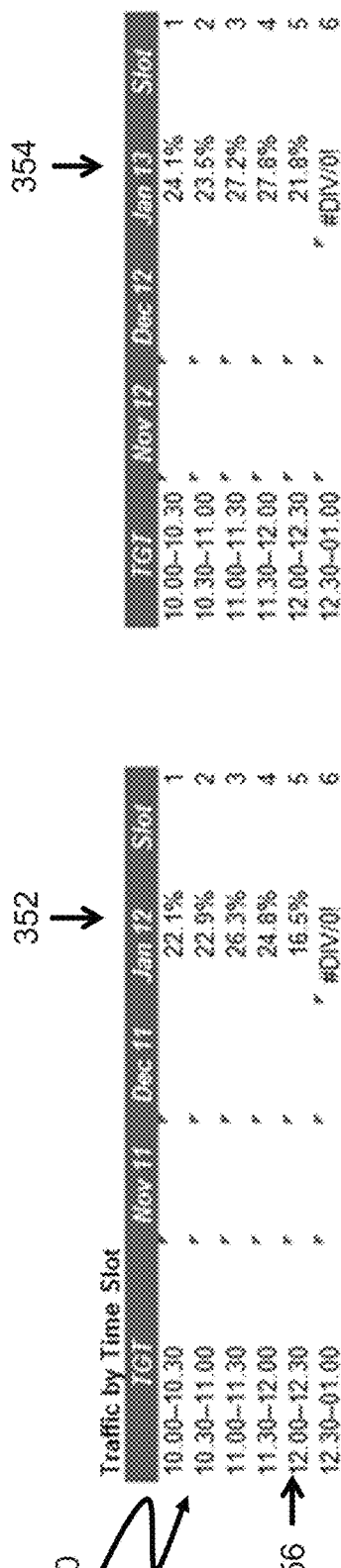
FIG. 3E

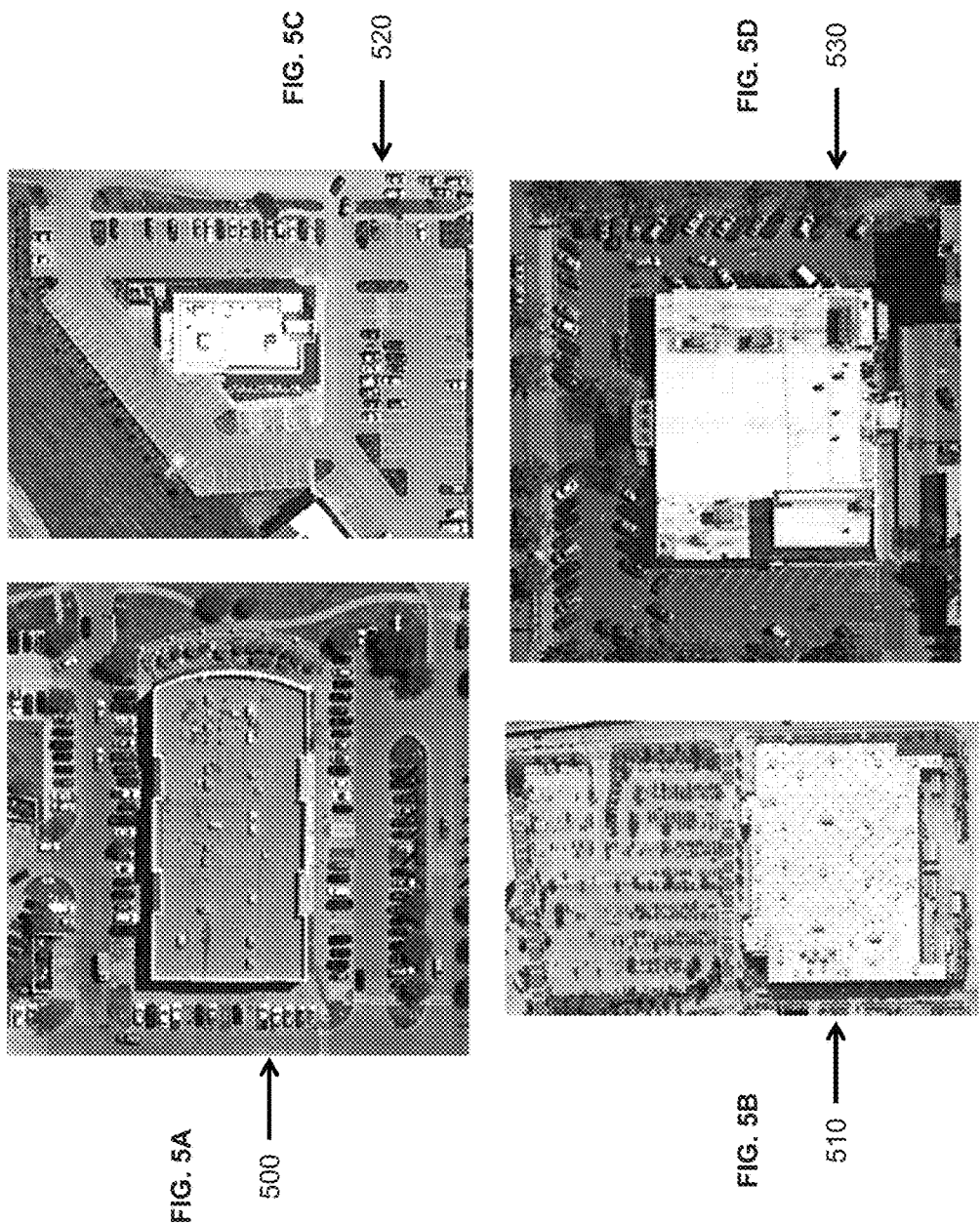

SYSTEM AND METHODS FOR GENERATING QUALITY, VERIFIED, AND SYNTHESIZED INFORMATION

CROSS-REFERENCE TO RELATED APPLICATIONS

This application is a continuation of U.S. patent application Ser. No. 14/215,954 filed on Mar. 17, 2014, which claims priority to U.S. Provisional Application No. 61/799,816 filed Mar. 15, 2013, both of which are incorporated by reference herein in their entirety.

OVERVIEW

From time to time, a user may wish to acquire certain detailed information about a topic. For purposes of this application, the term "user" collectively describes a person, group, entity, corporation that wishes to acquire information typically related to trends and analysis based on information that may be acquired from one or more sources. Also, for purposes of this application, the term "topic" collectively describes a person, group, entity, item, location, event, trend, issue, fact, or anything else about which a user wishes to acquire certain detailed information. Certain known procedures for acquiring information includes searching for or requesting images regarding a topic and then permitting human review of the images to identify information in those images. However, known procedures are often limited in the search/request parameters by which images may be found. Accordingly, many irrelevant or useless images are returned to the user with only some images that are possibly relevant. Such irrelevant or useless images must be sorted and reviewed to identify the relevant images.

Some known procedures attempt to deal with irrelevant or useless images by providing a feedback mechanism through the use of which additional images may be requested in order to increase the sample size. Although the feedback mechanism may provide additional images, the search/request parameters are still limited in scope. Simply obtaining more pictures does not automatically guarantee that the desired images will be produced.

Another challenge often associated with obtaining information regarding a selected topic includes obtaining information that is location specific. Certain known systems address this challenge by setting up a recording device at a specific location and operating such a device continuously, automatically, or remotely. However, if the person wishes to obtain observations regarding a large topic or multiple topics that are not within the range of a single recording device located at a specific location, positioning and maintaining multiple recording devices may be cost-prohibitive.

Additionally, at times, the full scope of information that a user wishes to obtain regarding a topic is not available from any one resource. In such instances, a user may need to access two or more resources that contain some information about the topic. While such multiple resource information allows the user to compare, combine, or otherwise synthesize the information in order to obtain a synthesized result that is accurate, the user must engage in a verification process for each acquired piece of information. The result may be quantified in one or more sets of information that is verified.

Other known systems address the challenge of obtaining desired images by acquiring one or more already-existing image representations of a selected topic. However, already-existing image representations may not depict the entirety of the desired topic or may not include metadata or, even if they do include metadata, may not include renderable metadata.

Additional known systems may address the challenge of obtaining desired image representations by engaging a third party to provide such image representations that depict a topic. However, a third party representation of a topic may be incomplete (e.g., only depict a portion of the topic), fuzzy (not high enough resolution), blocked (obstruction blocking desired or complete view of topic), incompatible (images from different or unknown time periods), or inaccurate (e.g., not depict the topic at all).

Even if the user obtains one or more images depicting certain information about a given topic, there may be additional questions about whether the one or more images are compatible for comparison. For example, if a user wishes to compare the holiday season sales of a first retail store with the holiday season sales of a second retail store, the user may obtain two sets of information—e.g., (1) number of vehicles in the parking lot of the first retail store during one day in the holiday season and (2) number of vehicles in the parking lot of the second retail store during a day in the holiday season. However, if the vehicle count at each store did not occur on the same day, the value of the comparison may be limited.

An additional concern arises in the steps taken to analyze and synthesize data from image representations of a topic, particularly when large quantities of data is required from multiple image representation sources to provide meaningful statistical information about the particular topic of interest. Accordingly, steps must be taken to account for differences in how and when the information was obtained and analyzed.

There is a demand for an improved system and methods of identifying, assessing, obtaining, evaluating, processing and displaying information about specific topics of interest. The present invention satisfies this demand.

SUMMARY OF THE INVENTION

Certain embodiments of the present invention include first identifying the objective of the research. The objective may be to find a detail about one or more topics, answer one or more questions, compare information about one or more topics or define other information that an entity wishes to know about one or more topics. The identifying step may include defining a topic at a broad level (e.g., some Subway® franchise) or at a specific level (e.g. Subway® franchise at specific address).

In certain embodiments, only a single topic may be identified (e.g., a retail store parking lot, restaurant parking lot, service provider parking lot, coal pile, landfill, marine port, or construction site, to name a few.). The single topic may be captured at a single time point or at multiple time points (e.g., in relationship to time, multiple times per minute/hour/day/month/year).

In certain embodiments, any two or more topics may be identified to form a topic collection (also termed a "set of topics" in this application). For example, one topic collection may include multiple locations of the same retail store (e.g., First Topic=Best Buy® retail store in California, Second Topic=Best Buy® retail store in Illinois, Third Topic=Best Buy® retail store in New York), which permits comparison of a chain store in different regions. Another topic collection may include multiple competing retail chains in a single geographic region (e.g., First Topic=Petsmart® in Chicago, Ill., Second Topic=Petco® in Chicago Ill., Third Topic=Pet Supplies Plus in Chicago, Ill.).

An additional topic collection may include multiple competing retail chains in multiple geographic regions (e.g., First Topic=Walgreens in Texas, Second Topic=CVS® in South Carolina, Third Topic=Rite Aid in Pennsylvania). Other topic collections may include clusters of certain retail stores, e.g., regional cluster of representative stores. Additional topic collections may include multiple locations of the same retail store each having multiple observations, multiple retail stores in multiple regions (e.g., an index), and multiple retail stores at one location (e.g., indoor malls).

In certain embodiments, a topic collection may include a random sample or a complete list of all stores in a specific chain or a franchise. A plurality of topic collections may be generated, for example, to prepare information about sectors of the economy, sectors of industry, or other larger groups. Each topic collection may be configured to permit obtaining certain content information efficiently.

Once the objective is identified, one embodiment includes assessing whether the information can be found from a single known source. If not, the next step may include determining what component information may be useful to generate the answer. The component information may include information obtained from primary sources and secondary sources. Information from a primary source may be that which may be perceived directly by people or computers. Secondary source information may be all information that is perceived in some way other than a direct observation (e.g., while the primary source may be an observation, the observation was published in a reputable journal, so the second source information is from a secondary source).

The next step may include obtaining component information. Component information about the topic may require capturing information in multiple locations or at multiple time points, for example, if certain topics have multiple components or are mobile. One method to obtain such information is to record the topic for location-remote or time-shifted viewing using a recording device.

For purposes of this application, a "recording device" may be any mechanical or electronic device configured to generate a visual or audio recording. A recording device may be configured as a camera or a rendering instrument. Examples of a camera include a still camera, digital camera, video camera, webcam, camera integrated with a mobile phone, traffic camera, security camera, satellite camera, aerial mapping camera, aerial laser measurement (LiDAR), aerial or satellite radar measurement (SAR), aerial thermal mapping (heat), pneumatic tubes to measure car movements, vehicle-mounted cameras (Google Streetview, or other views generated from car, truck, van, train, helicopter, airplane, space shuttle, or boat, to name a few), or audio recording devices. A rendering instrument may be any instrument by which a person may observe component information and document information relevant to the topic. A rendering instrument may rely on human observations related to the topic. Examples of such instruments are pen, pencil, marker, ink, paper, paint, paintbrush, canvas, surface, tablet, mobile device, stylus, program used to prepare a digital rendering, or other such instruments.

Recorded component information may then be presented as individual sample points, based on a specific time and location. Each individualized sample points, for purposes of this application, is termed "representation" and more than one representation is termed "representations". Representations may depict component information from multiple time points, multiple location points, or a combination of multiple time and location points. Representations may also include component information from one or more primary sources, one or more secondary sources, or a combination of component information from one or more primary sources and one or more secondary sources.

In certain embodiments, the representations may be configured to depict, for example, coal stock piles or landfills from which volume information may be calculated and compliance information or environmental information may be determined. Certain embodiments include representations configured to depict, for example, progress of a construction site which may permit off-site or remote monitoring and compliance with deadlines.

In certain embodiments, representations may depict onshore and offshore oil wells, onshore and offshore gas wells, factory parking lots which permit measuring employee traffic to predict factory output, commuter transportation parking lots which may permit assessing rail/bus use to track employment of the broader economy and regional transportation needs, factory inventory yards, wind turbines, car lots, construction machinery especially large machinery that gets produced and stored outside, large utility scale solar panel projects (e.g., First Solar projects in Mojave Desert), mines including pit activity, waste piles, and leach ponds, agricultural areas which may permit predicting size of harvest and/or health of the crops, ports which may permit monitoring shipping containers, commodities piles, and overall activity, hospital parking lots to track patient utilization, power plants to track activity including raw material resources including coal piles, dams, bridges, highways, or toll booths.

In certain embodiments of the present invention, a search or request for a selection of representations generated from a camera such as a satellite camera may be prepared. The search or request element may include criteria by which the results are refined. Such criteria may include resolution, pixilation, cloud cover, date of creation, date of modification, time of day of creation, type of camera, zoom in or zoom out, completeness of coverage of topic, removal of duplicate portions of topic, perspective from which representation was captured, or other conditions which were configured to maximize the relevance of the resulting selection of representations.

Certain embodiments of the present invention may include acquiring one or more representations that include renderable metadata such that the metadata may be automatically extracted or readily extractable from the representation file.

In certain embodiments of the present invention, the purpose of obtaining one or more representations may be for evaluating specific characteristics found within the one or more representations—termed "selected content" or "content information"—from which certain information may be further processed. For example, in certain embodiments, the representations may be configured to depict retail parking lots from which specific economic information or commercial information about the associated retail stores may be estimated.

One embodiment allows the criteria to be selected by which the one or more representations for content information may be evaluated, examples of such criteria include but are not limited to defining a specific time point and economic baseline for a particular retail chain in a given zip code. A determination may then be made whether or not such minimum baseline or threshold was met by a statistical evaluation of quantified information using the provided representations. If the minimum threshold is not met, then the representation may be removed from the data set of content information. If the minimum threshold was met, then the representation may be retained within the data set for further evaluation of the content information.

Additional certain embodiments for evaluating the one or more representations may include criteria by which representations may be selected including adequate image resolution, tolerable level of cloud cover or other obstructions, certain level of completeness, and whether the desired topic is illustrated as desired. In certain embodiments, the selection of representations may be evaluated for appropriate and accurate coverage of the topic.

In certain embodiments, content information may be extracted from a set of representations. Content information may be extracted manually by a human reviewing the representation, extracted automatically by a computer system, or extracted by a combination of human and system review. In certain embodiments, the extracted content information may be exported to a document, notification, or other output. Also, the extracted information may be further evaluated based on relevance to the achieving the research objective.

In certain embodiments, content information may be extracted from the representations by the user reviewing the representation and documenting content from observing the representation. Documenting information may include counting cars in a parking lot, counting empty spaces in a parking lot, dividing number of cars by number of spaces to determine a fill rate, area measurements of a store or parking lot or topic, counting "share of cars" at competing retailers (total cars at retailer A vs. total cars at retailer A and retailer B), counting boats in a port, counting semi-trailers at a delivery dock, changes since last date a representation was captured (e.g., store parking lot expansion or remodel, store expansion or remodel), changes in number of items, describing state of a construction project, or making other observations about that which is depicted in the representation. The content information may be also integrated into an information storage component.

In other embodiments, the user may specifically direct the system to extract the metadata. Metadata may include the time and date of creation of the representation, time and date of last edit of the representation, satellite information, footprint of the image collection as related to the geographic boundaries of topic, product type, and other information saved in association with the representation. Examples of a "product type" include coarsely orthorectified panchromatic or 3-band natural color imagery in GeoTIFF or JPEG2000 format in a UTM WGS84 Meters coordinate system. The automatic or user-implemented extraction of metadata may result in a metadata output. The metadata output may be configured to be automatically integrated into a content information interface or configured to be uploaded to an information storage component upon order by the user.

In certain embodiments, specific content information, for example, metadata, may be automatically extracted from the representation upon receipt of the representation in the user's system.

In certain embodiments, if a certain threshold of irrelevant representations is presented, the system may dispatch an invitation to further refine the active criteria in the search/request component in an effort to improve the resulting representations and content information rather than automatically remove such representations from the data set of content information.

In certain embodiments, after evaluating the one or more representations for content information depicting a topic or topic collection, the content information may undergo one or more processing steps. The processing steps may include defining subtopics of interest from the content information, calculating statistics related to the content information subtopic, balancing the content information subtopic, and synthesizing the content information subtopic.

In certain embodiments, a processing step of the content information as a subtopic may include overlaying coordinate units to the content information to detect which coordinate units intersect with a subtopic or a component of a subtopic. The coordinate units that do not intersect with a subtopic or a component of a subtopic optionally may be eliminated from the content information or labeled in some manner. The coordinate units that do intersect with a subtopic or a component of a subtopic may be further examined. For example, for cloud cover, coordinate units that have, for example, more than 95% cloud cover may be purged from the representation collection. The remaining coordinate units may be further pared down based on resolution parameters. For example, representations having an average resolution of less than 0.95 panchromatic may be chosen.

In certain embodiments, the processing steps of the content information as a subtopic may be repeated for additional content information from a second set of representations or representation collections. For example, a first processing cycle may process representations from retail stores in January 2012 and a second processing cycle may process representations for retail stores in January 2013 to permit a 2012-2013 comparison.

One embodiment of a subtopic of interest that may utilize the processing step is a yearly comparison of content information related to one or more retail stores, selected dates for year-over-year comparable periods of time, and specific environmental parameters, such as cloud coverage for certain time periods with respect to specific geographical locations.

One embodiment of a subtopic of interest that may utilize the processing step is the identification of all content information for businesses that utilize GIS.

One embodiment of a subtopic of interest that may utilize the processing step is a compilation of all imagery that intersects with all representations within the content information. Such imagery may include, but is not limited to, that regarding a previous selection sub-select data, and which has a cloud cover of less than 70% across the full image, or which has an average panchromatic resolution of less than 0.85 centimeters per pixel, or which matches the correct dates needed based on the question.

One embodiment of a processing step of the content information as a subtopic may include writing selections to new features and combining features into a single feature.

One embodiment of a processing step of the content information as a subtopic may include dissolving certain features based on spatial overlap and common fields including, but not limited to, "Ticker", "Address", "State", "Store_OID", "Zip", "CATALOGID", "ACQDATE", "AVPANRES", "BROWSEURL", "CLOUDCOVER", "Latitude", and "Longitude".

One embodiment of a processing step of the content information as a subtopic may include sorting features by panchromatic resolution.

One embodiment of a processing step of the content information as a subtopic may include removing duplicate observations, such as those of retail stores at the same time point.

One embodiment of a processing step of the content information as a subtopic may include dissolving a second time based on common fields found in imagery metadata including, but not limited to, "CATALOGID", "ACQ-DATE", "AVPANRES", "BROWSEURL", "CLOUD-COVER".

One embodiment of a processing step of the content information as a subtopic may include finding and deleting oversampled observations. Such oversampled observations may include, but are not limited to, large corporate retail entities, such as AutoZone®, Starbucks®, Walmart®, etc.

One embodiment of a processing step of the content information as a subtopic may include calculating the area of each remaining feature/observation.

One embodiment of a processing step of the content information as a subtopic may include detecting and removing observations that are less than a certain geographical quantity, such as 2 square kilometers, and that may be visually distorted by a certain quantity, such as cloud overcast by greater than 40% of the geographical region of the observation.

One embodiment of a processing step of the content information as a subtopic may include ascertaining and deleting all observations that are less than a certain geographical quantity, such as less than 1.5 square kilometers.

One embodiment of a processing step of the content information as a subtopic may include buffering all observations under a specific geographical quantity, such as 3 square kilometers.

One embodiment of a processing step of the content information as a subtopic may include counting all remaining features by date of acquisition.

Certain embodiments of a processing step of the content information include one or more balancing steps of the content information subtopic. The one or more balancing steps of the content information subtopic may include eliminating outliers, reducing imbalance from over or under sampling, randomizing and simulating multiple possible final datasets by systematically removing the imbalances in a random way or systematic way multiple times, weighting data points according to relevance, and applying coarsened exact matching statistical analysis.

In certain embodiments, the balancing steps may include procuring an appropriate sample size, correcting for oversampling or under sampling, or eliminating outliers, among other things.

In certain embodiments, the balancing steps may be conducted automatically by a computer system. In other embodiments, a human may manage one or more of the balancing steps.

In certain embodiments, a program may be expressed in a language such, as a script in the "R" programming language, and may be configured to automatically run representations through the selected balancing steps and record results for further analysis and evaluation.

In certain embodiments, the balancing steps may be based on the number of trails based on user input.

In certain embodiments, the balancing steps may be based on parking lot data, including the size and shape of the parking lot to define capacity.

In certain embodiments, the balancing steps may be based on input values of time, including overall time, from hours to days to weeks to years, and specific time, including days of the week or hours in the day.

In certain embodiments, the balancing steps may be based on input values of geographical location and information pertaining to the specific geographical location, such as capacity utilized within the geographical location.

In certain embodiments, the processing steps also may include generating synthesized information from a number of different combinations of content information subtopics. For example, if the content information from a group of representations includes a number of figures that may or may not be considered outliers by certain statistical methods, a number of synthesis steps may be conducted. For example, if the figures include A, B, C, and D, a first synthesis step may include synthesizing all figures A, B, C, and D. A second synthesis step may include synthesizing figures A, B, C, but not D (if, for example, D is an outlier under the quartile method). A third synthesis step may include synthesizing all figures A, B, D, but not C (if, for example, C is an outlier under the z-score method).

Additional processing steps may calculate the synthesized information based on other statistical methods. The user may choose one of the synthesized information sets as the final synthesized information or may combine or compare two or more synthesized information sets.

Certain embodiments of the processing step of the content information as a subtopic may include sending all remaining features to an imaging company, for example, a satellite company for order placement.

In certain embodiments of the processing step of the content information as a subtopic may include organizing content information as a subtopic based on the type and scope of synthesized subtopic content information. For example, if the synthesized information desired is the relative economics of pet stores in the Midwest Region of the United States over a one month time period in 2012 and a one month time period in 2013, all of the relevant entries from the subtopic representation collections may be entered into the content information dataset.

Certain embodiments also may permit forming supplemental synthesized information. For example, if a retail traffic result for a specific chain store is the first synthesized information and a retail traffic result for a specific chain store is the second synthesized information, a combination of the first retail traffic result and second retail traffic result is an index of traffic results—or supplemental synthesized information. Such an index may be formed by identifying a retail traffic result for big retailers (e.g., WalMart®, Home Depot®, Lowes®, McDonald's®) and weighting each retail traffic result by United States Revenue to correlate with the Bureau of Economic Analysis Consumer Spending Index.

Another example index embodiment may include a semiconductor index configured to track employment at semiconductor manufacturing and packaging plants around the world. Advantageously, certain embodiments of the present invention utilize representations derived from cameras mounted on satellites. Because such satellites orbit the Earth at a great distance, they may efficiently capture representations related to multiple topics without requiring a permanent camera positioned relative to the topic and without requiring a person wielding a camera to visit the topic for every observation.

Another example of synthesized content information of certain subtopics are population statistics regarding certain regions, e.g., towns, villages, cities, counties, states, all of which may include total number of people, number of females or males, population density, population growth predictions, average family size, age distribution of population, education level of population, income level for population, disposable income for population, race distribution of population, average number of people per household, and average number of cars per household. In other embodiments, synthesized information includes coal storage statistics, legal compliance requirements for landfills, or other information not derived from a representation.

In certain embodiments, the synthesized information may include information about: fill rates of parking lots; market share percentage of a particular retail store in geographic location; consumer confidence levels; trends in retail store revenues over time or over region; composition of same-store sales, same-store transactions, or same-store traffic at one or more retailers; market share shifts in one or more geographic locations at one or more retailers which may be measured as "share of cars" over a specific time period (total cars at retailer A/total cars at retailer A+retailer B+retailer N . . . ); conversion rates or "close rates" of cars in the parking lot versus actual transactions measured by the store itself (e.g., number of transactions in +/−15 minute period surrounding the timestamp of the image divided by the number of cars measured in the representation); employment trends for the economy as a whole or for a specific company; production/inventory trends for a specific company; historical traffic trends to monitor geographical "hot spots" for new store development; or effectiveness of a promotion, advertisement, remodeling project, or other occurrence. Other examples of synthesized information may include whether and for how long certain ships are docking in a port, quantity of coal in a coal pile, volume of waste in a landfill.

In other embodiments, synthesized information includes economic comparable topics by calculating the sum of growth, average growth, and shopper conversion rate growth. The resulting synthesized information may be configured to efficiently address the defined question.

In certain embodiments, the synthesized information may then be displayed to achieve the objective of the research. Certain embodiments of the present invention may require formatting of the synthesized information such that it may be sent to another entity. The formatting may include producing a report having numeric displays and optionally graphical displays of the synthesized information.

One advantage of certain embodiments of the present invention may permit maximizing the relevance of the selection of representations obtained.

Another advantage of certain embodiments of the present invention may permit verifying the significance of the selection of representations obtained.

Another advantage of certain embodiments of the present invention may eliminate or reduce the number of feedback loops needed (relative to known procedures) since the process is refined from the earlier search/request steps.

Another advantage of certain embodiments of the present invention may enhance comparability of content extracted from representations by balancing the content information, Another advantage of certain embodiments of the present invention may efficiently generate synthesized information about topics that may be difficult to observe from a non-aerial perspective.

Another advantage of certain embodiments of the present invention may efficiently generate synthesized information with increased accuracy.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which:

FIG. 1C illustrates one embodiment of the processing steps of the system according to the present invention;

FIG. 3D illustrates a certain embodiment of components of a report according to the present invention;

FIG. 3E illustrates a certain embodiment of components of a report according to the present invention;

FIG. 5A illustrates a certain embodiment of a representation;

FIG. 5B illustrates a certain embodiment of a representation;

FIG. 5C illustrates a certain embodiment of a representation;

FIG. 5D illustrates a certain embodiment of a representation; and

DETAILED DESCRIPTION OF SPECIFIC EMBODIMENTS OF THE INVENTION

FIGS. 1A through FIG. 1E illustrate certain embodiments according to the present invention.

Figure 1A:
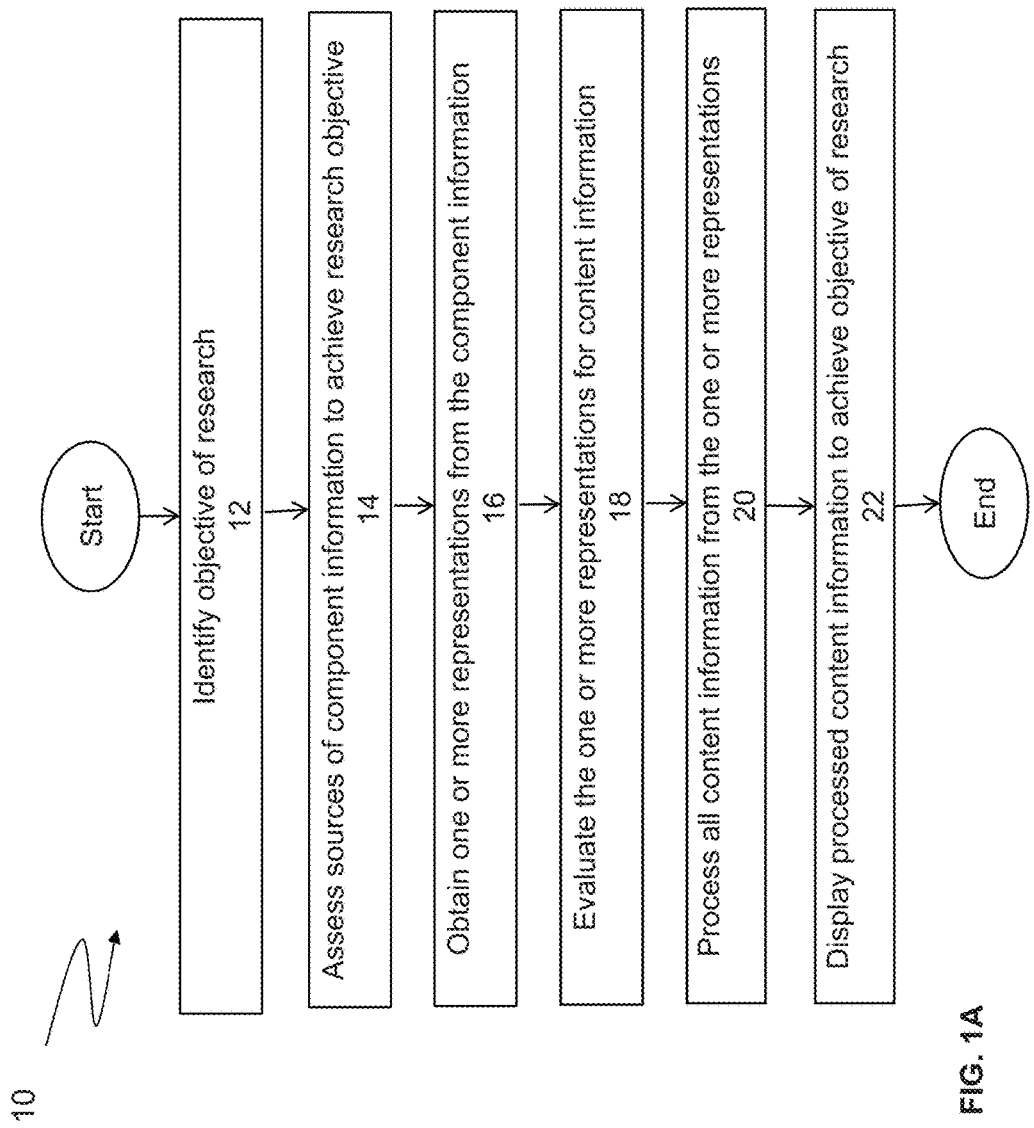
FIG. 1A illustrates one embodiment of the system according to the present invention.

In FIG. 1A, one of the preferred embodiments according to the present invention is illustrated. The user may first identify an objective of research 12 and assess sources of component information to achieve the research objective 14. One or more representations related to the topic may be obtained from the available component information 16. The one or more representations may then be evaluated for content information 18. The content information from the one or more representations may be processed 20. The processed content information may then be displayed to achieve the objective of the research 22.

Figure 1B:
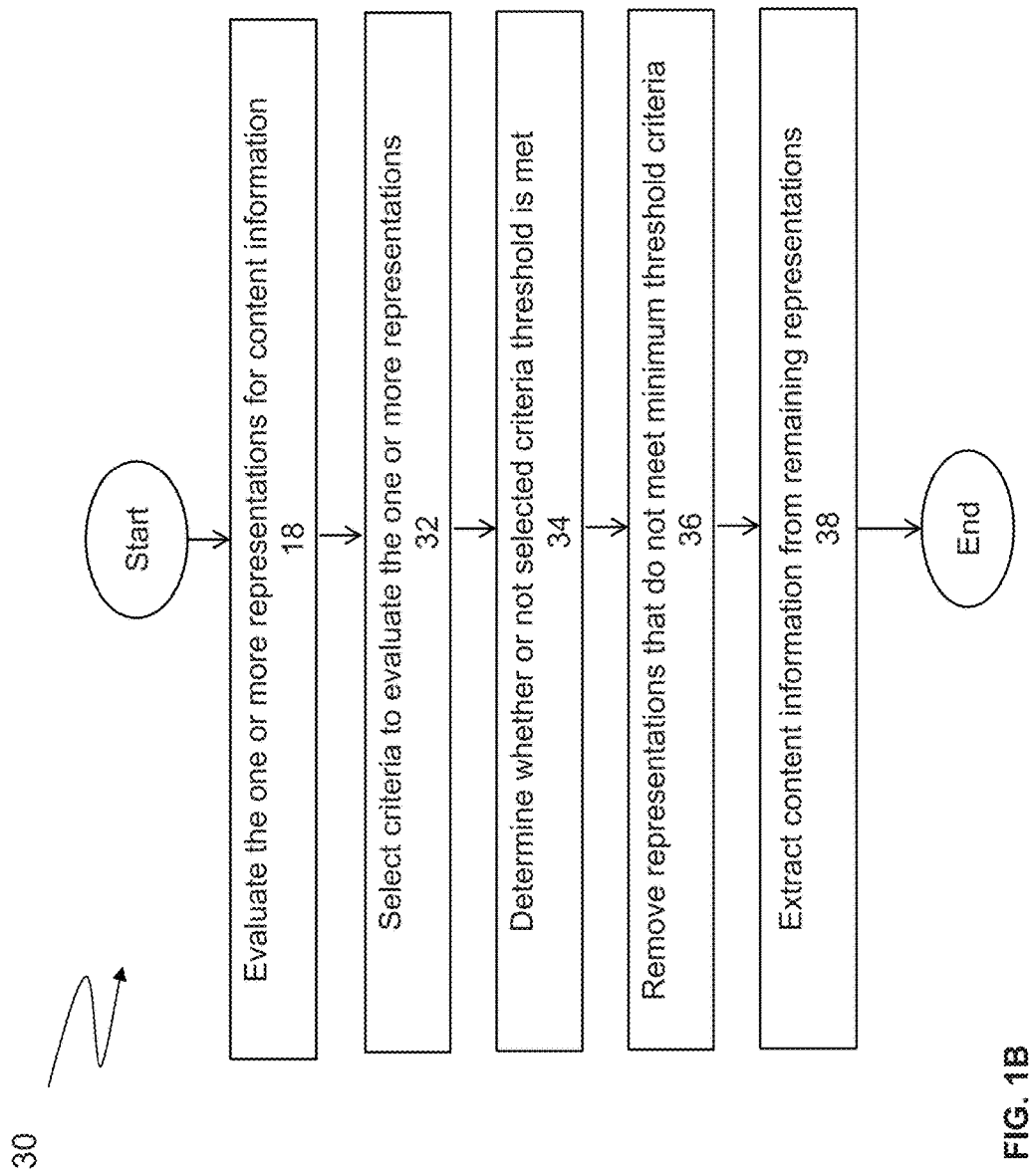
FIG. 1B illustrates one embodiment of he evaluation steps of the system according to the present invention.

FIG. 1B illustrates one preferred embodiment according to the present invention of the one or more evaluation steps 30 of the system 10 according to the present invention. When the one or more representations may be evaluated for content information 18, specific criteria may be selected to evaluate the one or more representations 32. The selected criteria may be defined as having met or not a minimum threshold 34. The representations that do not meet a minimum threshold of selected criteria may be removed from the data set of representations 36. The remaining representations may be extracted as content information 38.

FIG. 1C illustrates one preferred embodiment of the one or more processing steps 40 of the system 10 according to the present invention. When the content information from the one or more representations is processed 20, the content information may be defined as one or more subtopics of interest 42. Statistics related to the content information subtopics is then calculated 44. The content information from the subtopics is then balanced 46. The subtopic content information is then further synthesized based on user input 48.

Figure 1D:
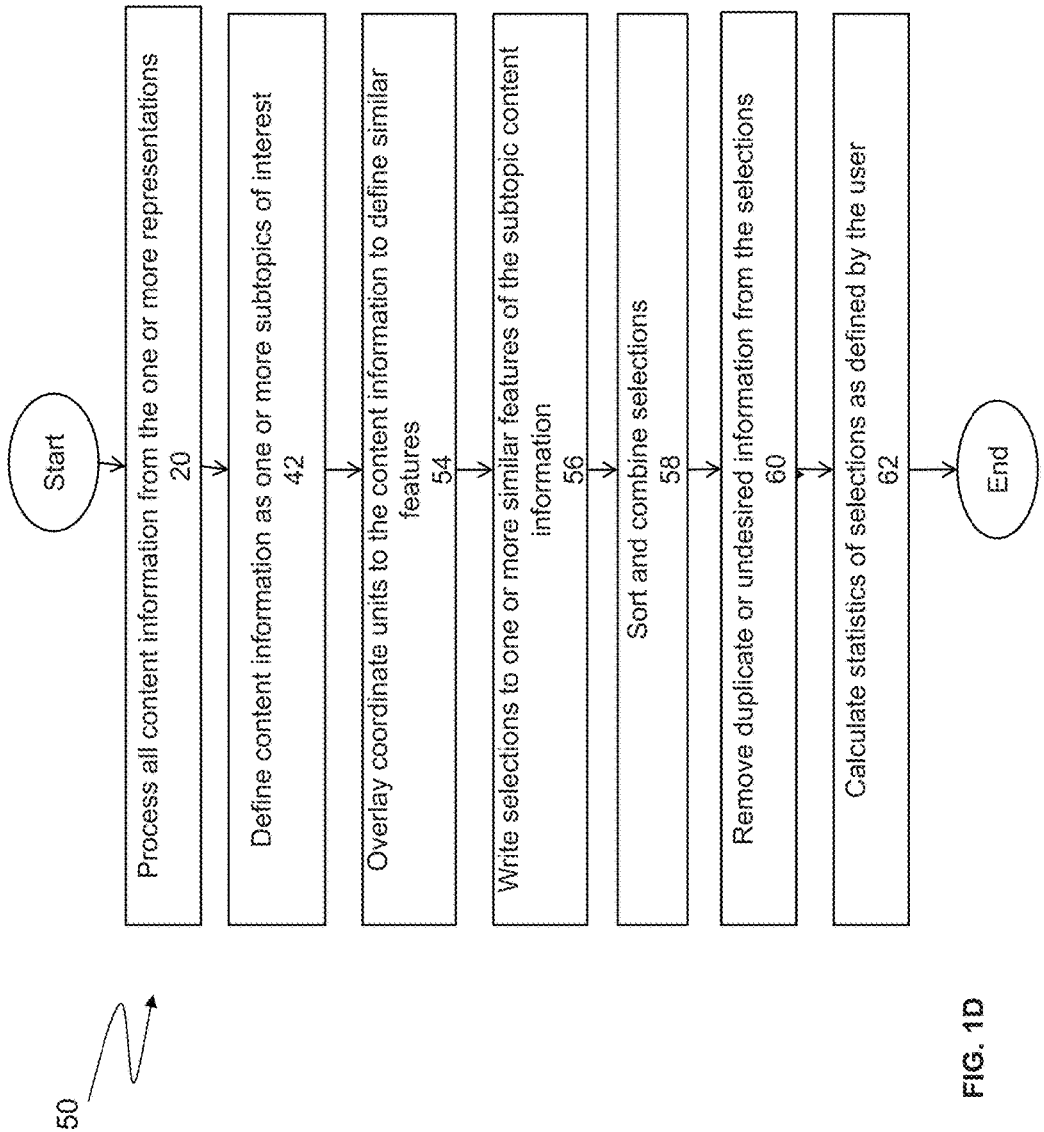
FIG. 1D illustrates an embodiment of additional processing steps of the system according to the present invention.

FIG. 1D illustrates a preferred embodiment of the one or more additional processing steps 50 of the system 10 according to the present invention. When the content information from the one or more representations is processed 20, the content information may be defined as one or more subtopics of interest 42. The content information of the subtopics may then be overlaid with coordinate units to define similar features 54. The one or more similar features of the content information may then be written into selections 56. The selections may then be quantitatively sorted and combined 58. The duplicate or undesired information may then be removed from the selections 60. The statistics of the selections, as defined by the user, are then calculated 62.

Figure 1E:
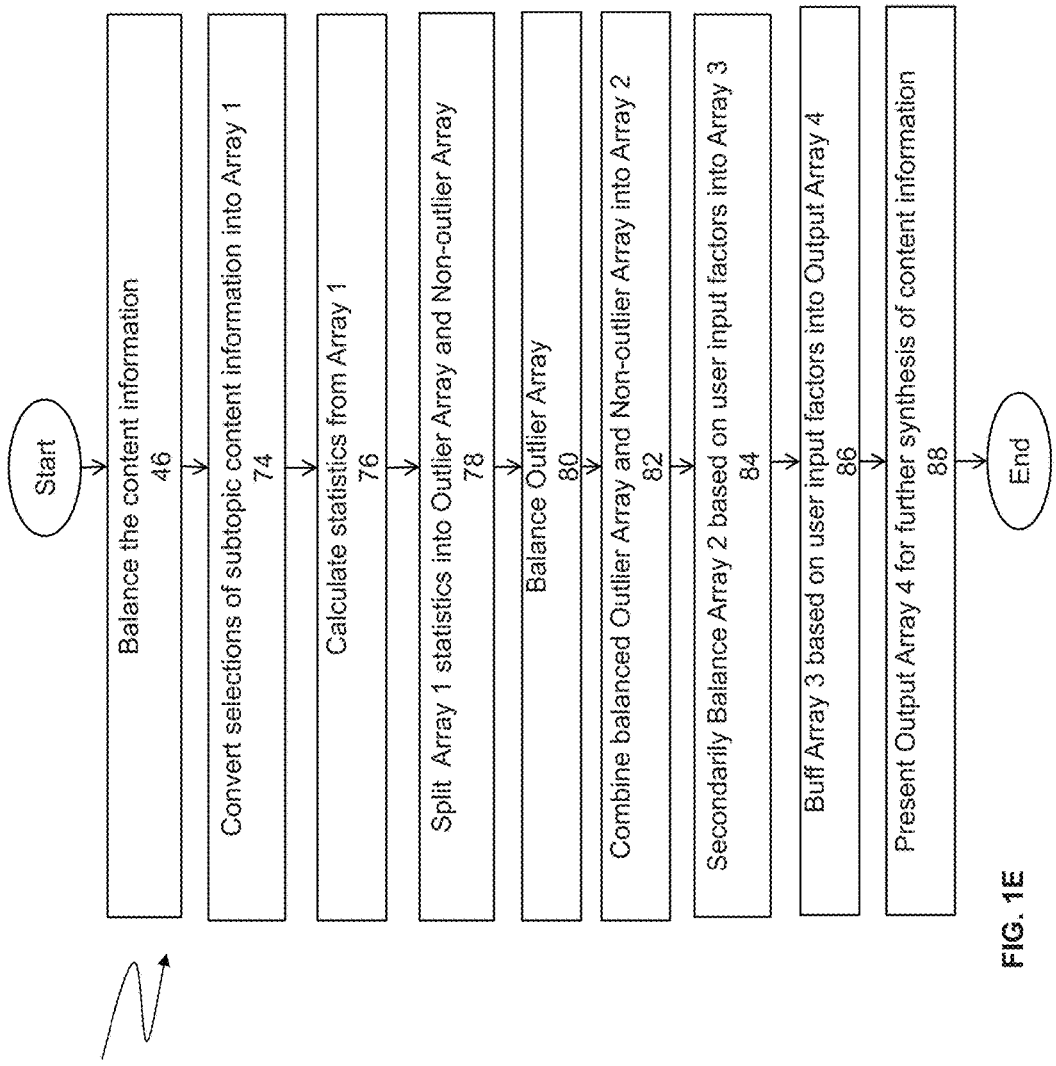
FIG. 1E illustrates an embodiment of balancing steps of the system according to the present invention.

FIG. 1E illustrates a preferred embodiment of the one or more balancing method 70 from the processing step of balancing the content information 46 according to the present invention. The content information may be converted into Array 1 74. Statistics may then be calculated from Array 1 76. Array 1 statistics may then be then split into an Outlier Array and Non-outlier Array if the standard deviation balancing is selected 78. If the standard deviation balancing is not selected, then Array 1 may remain unbalanced, does not split into an Outlier Array and Non-outlier Array and is converted, as is, to Array 2 82. If Array 1 is split, the Outlier Array may be balanced year-over-year such as by region of interest 80. The Non-outlier Array may remain unbalanced. The balanced Outlier Array and Non-outlier Array may then be combined into Array 2 82. A secondary balancing step is then performed on Array 2 based on user input factors, and is transposed into Array 3 84. Such user input factors may include, but are not limited to, averaging observations per day by region. Array 3 may then be buffed based on user input factors into Output Array 4 86. Such user input factors may include, but are not limited to, year-over-year by region, week, and day of week as well as calculating the overall and regional averages of Output Array 4. Output Array 4 is then displayed for further synthesis 88.

Figure 2A:
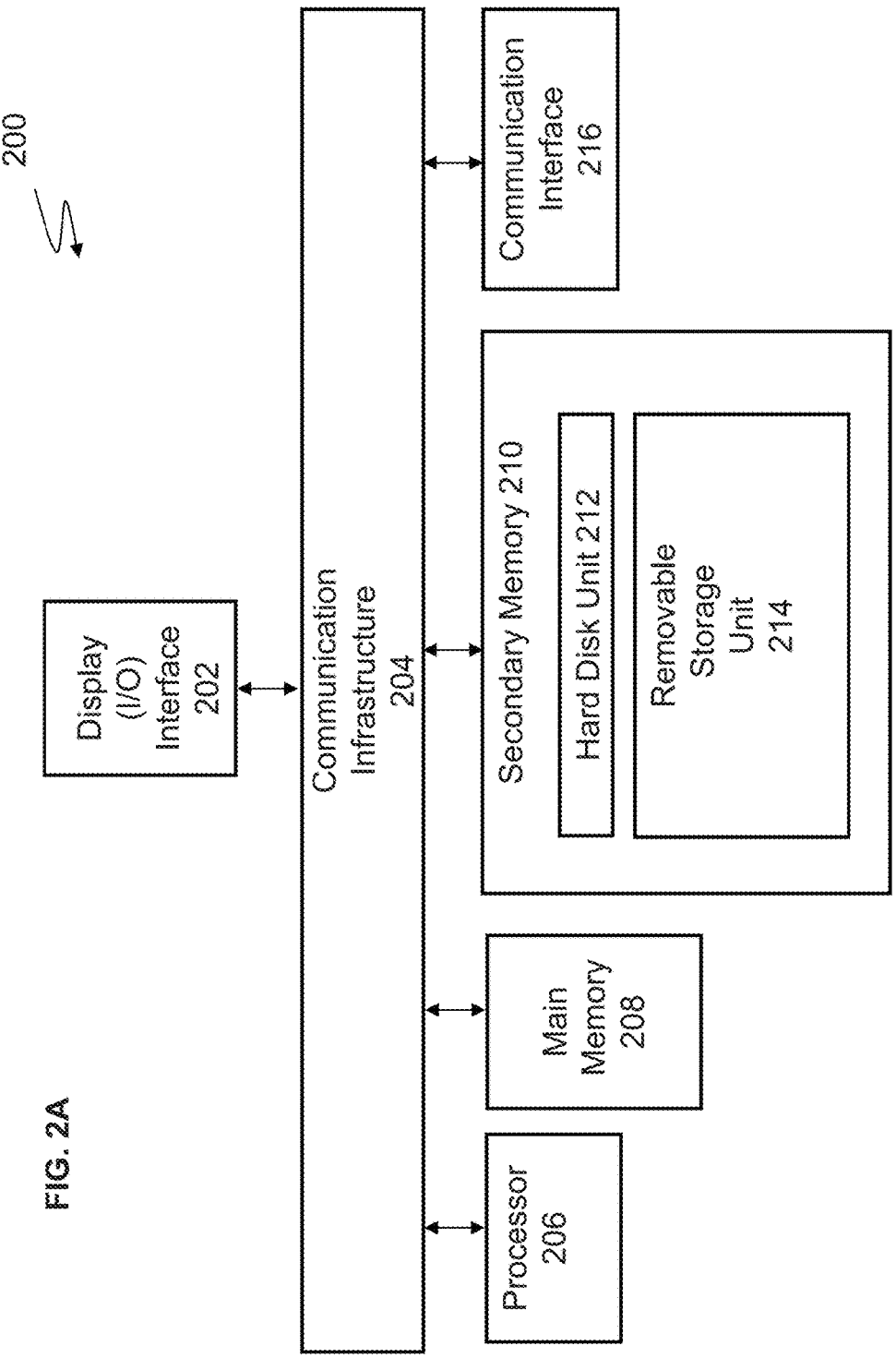
FIG. 2A illustrates an exemplary computer system.

FIG. 2A illustrates an exemplary computer system 200 that may be used to implement the methods according to the present invention. One or more computer systems 200 may carry out the methods presented herein as computer code.

Computer system 200 includes an input/output display interface 202 connected to communication infrastructure 204—such as a bus—, which forwards data such as graphics, text, and information, from the communication infrastructure 204 or from a frame buffer (not shown) to other components of the computer system 200. The input/output display interface 102 may be, for example, a keyboard, touch screen, joystick, trackball, mouse, monitor, speaker, printer, any other computer peripheral device, or any combination thereof, capable of entering and/or viewing data.

Computer system 200 includes one or more processors 206, which may be a special purpose or a general-purpose digital signal processor that processes certain information. Computer system 100 also includes a main memory 208, for example random access memory ("RAM"), read-only memory ("ROM"), mass storage device, or any combination of tangible, non-transitory memory. Computer system 200 may also include a secondary memory 210 such as a hard disk unit 212, a removable storage unit 214, or any combination of tangible, non-transitory memory. Computer system 200 may also include a communication interface 216, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 208, secondary memory 210, communication interface 216, or a combination thereof, function as a computer usable storage medium, otherwise referred to as a computer readable storage medium, to store and/or access computer software including computer instructions. For example, computer programs or other instructions may be loaded into the computer system 200 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 214 or hard disc unit 212 to the secondary memory 210 or through the communication infrastructure 204 to the main memory 208 of the computer system 200.

Communication interface 216 allows software, instructions and data to be transferred between the computer system 200 and external devices or external networks. Software, instructions, and/or data transferred by the communication interface 216 are typically in the form of signals that may be electronic, electromagnetic, optical or other signals capable of being sent and received by the communication interface 216. Signals may be sent and received using wire or cable, fiber optics, a phone line, a cellular phone link, a Radio Frequency ("RF") link, wireless link, or other communication channels.

Computer programs, when executed, enable the computer system 200, particularly the processor 206, to implement the methods of the invention according to computer software including instructions.

The computer system 200 described herein may perform any one of, or any combination of, the steps of any of the methods described herein. It is also contemplated that the methods according to the present invention may be performed automatically, or may be accomplished by some form of manual intervention.

The computer system 200 of FIG. 2A is provided only for purposes of illustration, such that the invention is not limited to this specific embodiment. It is appreciated that a person skilled in the relevant art knows how to program and implement the invention using any computer system.

The computer system 200 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 2B:
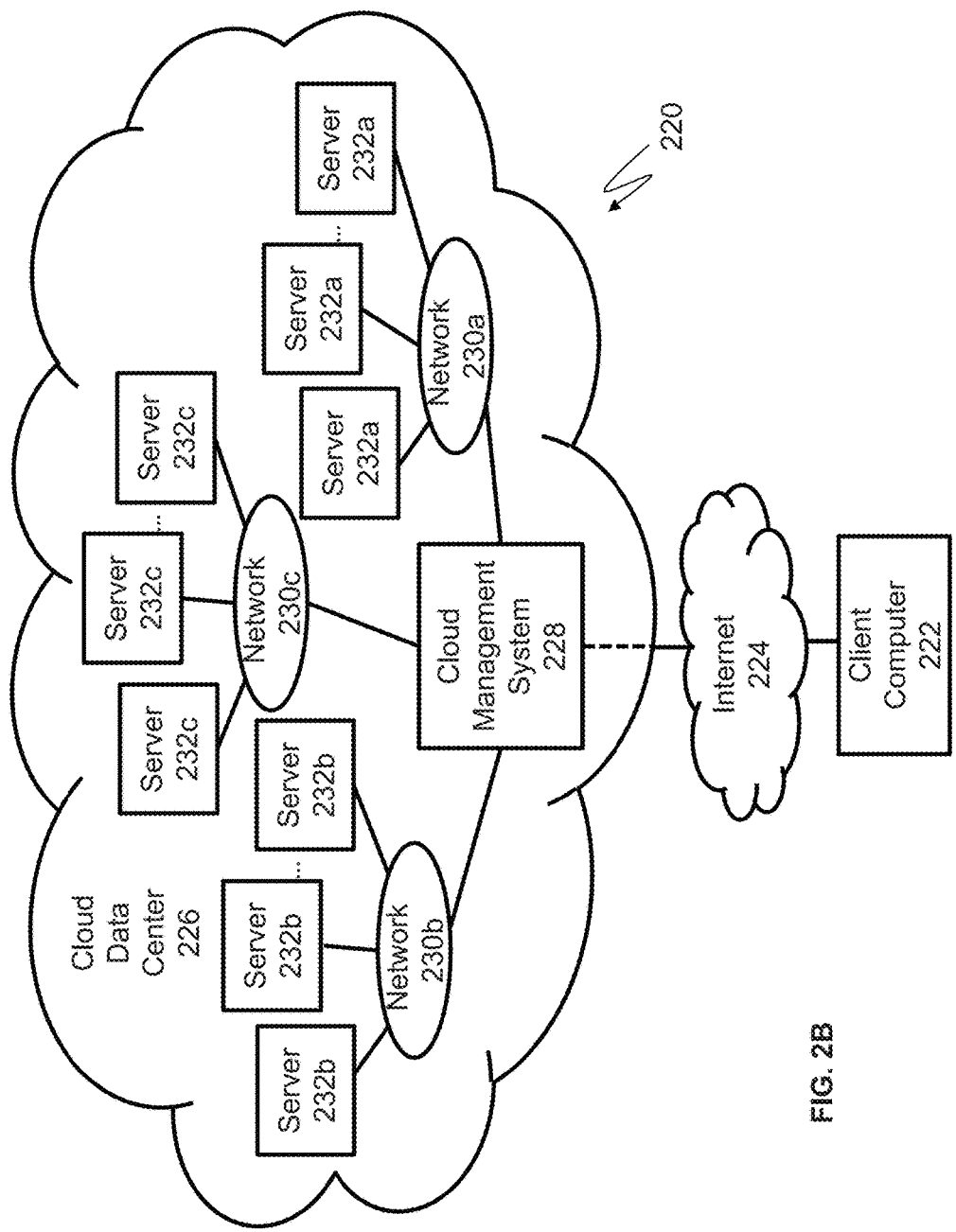
FIG. 2B illustrates a cloud computing system.

FIG. 2B illustrates an exemplary cloud computing system 220 that may be used to implement the methods according to the present invention. The cloud computing system 220 includes a plurality of interconnected computing environments. The cloud computing system 220 utilizes the resources from various networks as a collective virtual computer, where the services and applications can run independently from a particular computer or server configuration making hardware less important.

Specifically, the cloud computing system 220 includes at least one client computer 222. The client computer 222 may be any device through the use of which a distributed computing environment may be accessed to perform the methods disclosed herein, for example, a traditional computer, portable computer, mobile phone, personal digital assistant, tablet to name a few. The client computer 222 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 222 also includes a communications interface, for example, a modem, a network interface (such as an Ethernet card), a communications port, a PCMCIA slot and card, wired or wireless systems, etc. The communications interface allows communication through transferred signals between the client computer 222 and external devices including networks such as the Internet 224 and cloud data center 226. Communication may be implemented using wireless or wired capability such as cable, fiber optics, a phone line, a cellular phone link, radio waves or other communication channels.

The client computer 222 establishes communication with the Internet 204—specifically to one or more servers—to, in turn, establish communication with one or more cloud data centers 226. A cloud data center 226 includes one or more networks 230a, 230b, 230c managed through a cloud management system 228. Each network 230a, 230b, 230c includes resource servers 232a, 232b, 232c, respectively. Servers 232a, 232b, 232c permit access to a collection of computing resources and components that can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. A further group of resource servers can host and serve applications to load on an instantiation of a virtual computer, such as an email client, a browser application, a messaging application, or other applications or software.

The cloud management system 228 can comprise a dedicated or centralized server and/or other software, hardware, and network tools to communicate with one or more networks 230a, 230b, 230c, such as the Internet or other public or private network, with all sets of resource servers 232a, 232b, 232c. The cloud management system 228 may be configured to query and identify the computing resources and components managed by the set of resource servers 232a, 232b, 232c needed and available for use in the cloud data center 226. Specifically, the cloud management system 228 may be configured to identify the hardware resources and components such as type and amount of processing power, type and amount of memory, type and amount of storage, type and amount of network bandwidth and the like, of the set of resource servers 232a, 232b, 232c needed and available for use in the cloud data center 226. Likewise, the cloud management system 228 can be configured to identify the software resources and components, such as type of Operating System ("OS"), application programs, and the like, of the set of resource servers 232a, 232b, 232c needed and available for use in the cloud data center 226.

The present invention is also directed to computer products, otherwise referred to as computer program products, to provide software to the cloud computing system 220. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electra-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 220 of FIG. 2B is provided only for purposes of illustration and does not limit the invention to this specific embodiment. It is appreciated that a person skilled in the relevant art knows how to program and implement the invention using any computer system or network architecture.

Figure 3A:
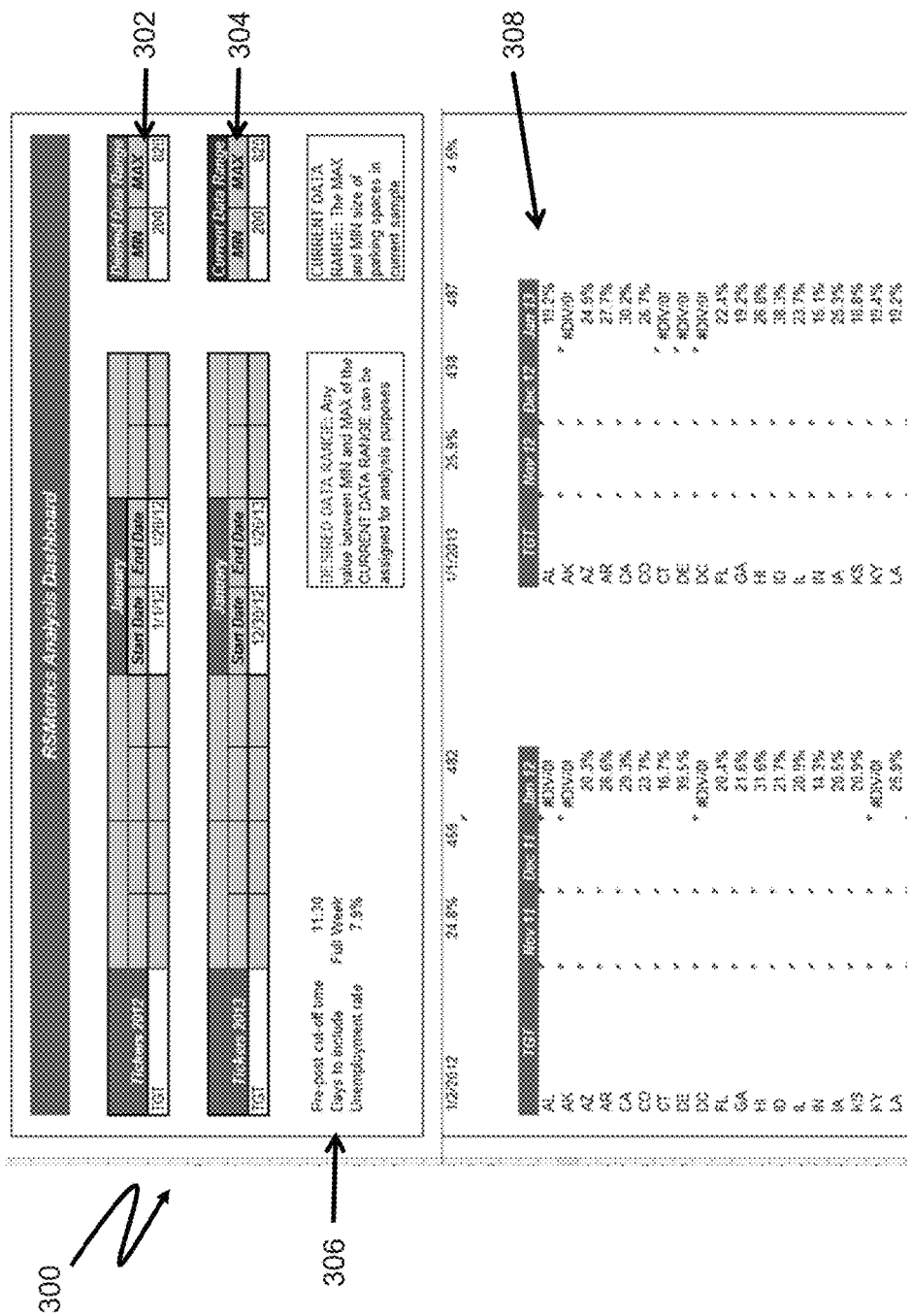
FIG. 3A illustrates a certain embodiment of a report according to the present invention.

FIG. 3A-FIG. 3D illustrate certain of the specific embodiments of the reports or components of reports that may be generated through the use of the present invention. FIG. 3A illustrates one embodiment of the overall Analysis Dashboard 300. Through dashboard 300, a user may input the desired minimum and maximum data range for the representations analyzed 302. The current data range may be, for example, the size of the minimum and maximum number of parking spaces contained within the sample 304. A time period may be selected by a user for the report 306. The associated statistics of the subtopic for the selected time and location indicated may be then reported 308.

Figure 3B:
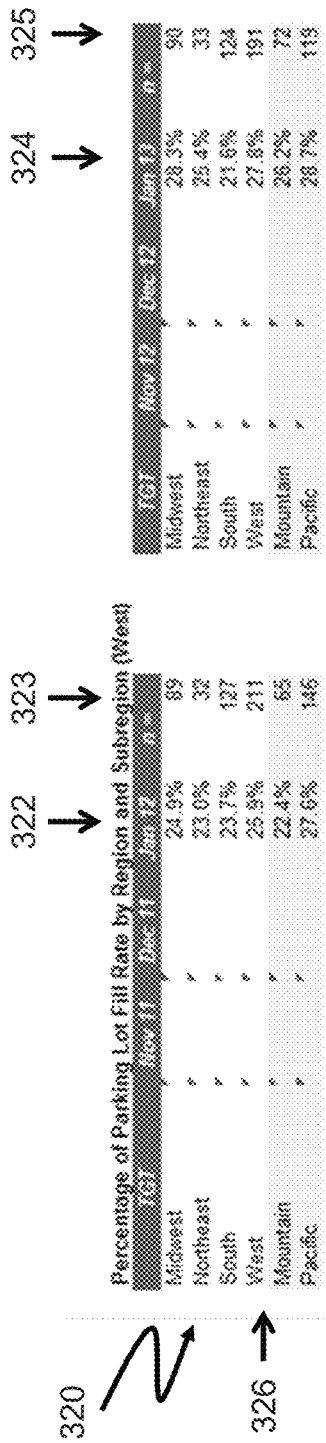
FIG. 3B illustrates a certain embodiment of components of a report according to the present invention.

FIG. 3B illustrates one of the many specific embodiments of a component of a report 320 that may be generated through the use of the present invention. The report may be configured to provide specific statistics 322, 324 that may be associated with particular subtopics of interest 326 for a given sample number or representations analyzed 323, 325.

Figure 3C:
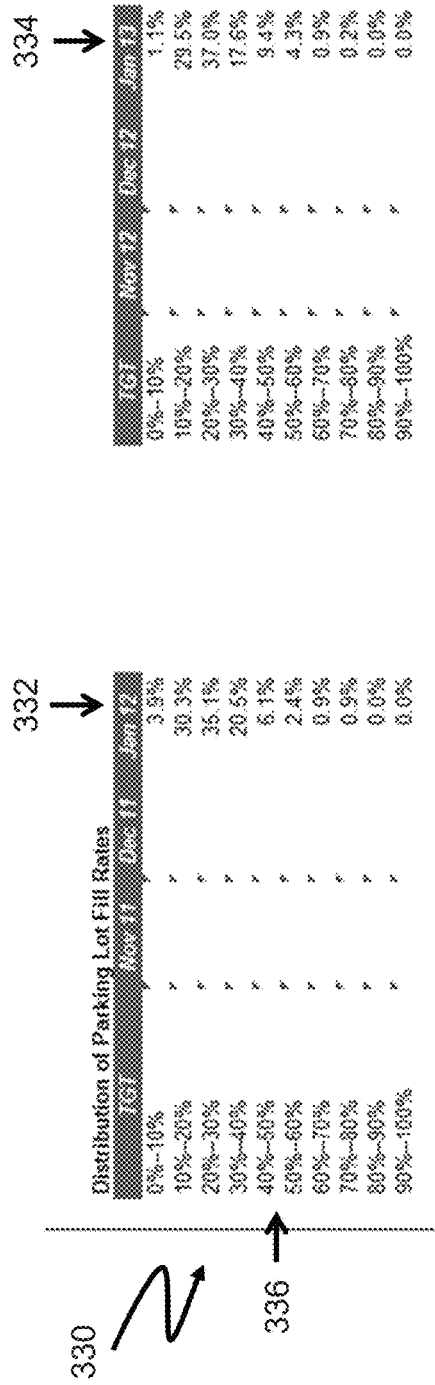
FIG. 3C illustrates a certain embodiment of components of a report according to the present invention.

FIG. 3C illustrates another specific embodiment of a component of a report 330 that may be generated through the use of the present invention. The component of the report 330 is another example of specific statistics 332, 334 associated with particular subtopics of interest 326.

FIG. 3D illustrates another specific embodiment of a component of a report 340 that may be generated through the use of the present invention. The component of the report 340 is another example of specific statistics 342, 344 associated with particular subtopics of interest 346.

Figures 4A, 4B:
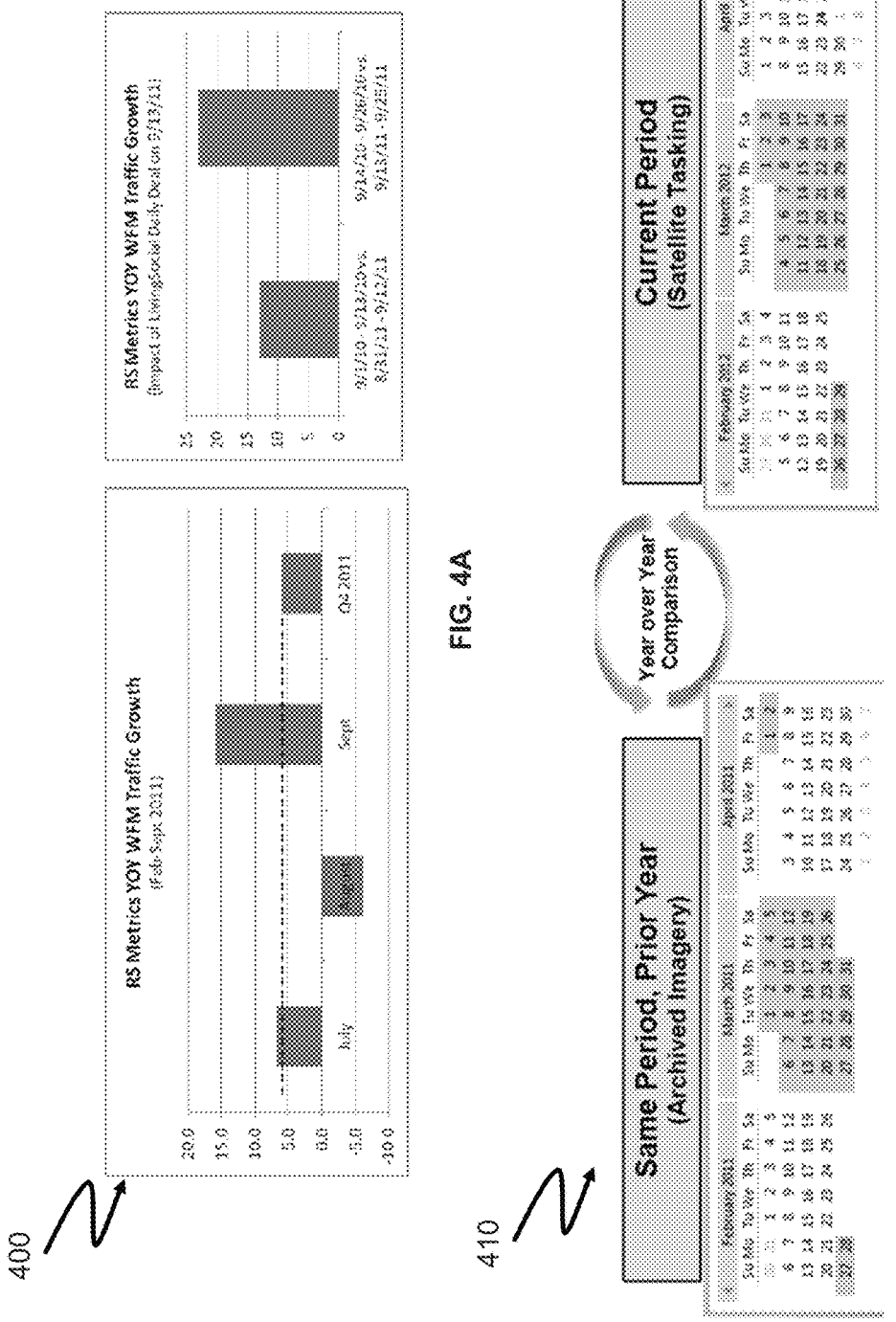
FIG. 4A illustrates a certain embodiment of components of a report according to the present invention.
FIG. 4B illustrates a certain embodiment of components of a report according to the present invention.
Figure 4C:
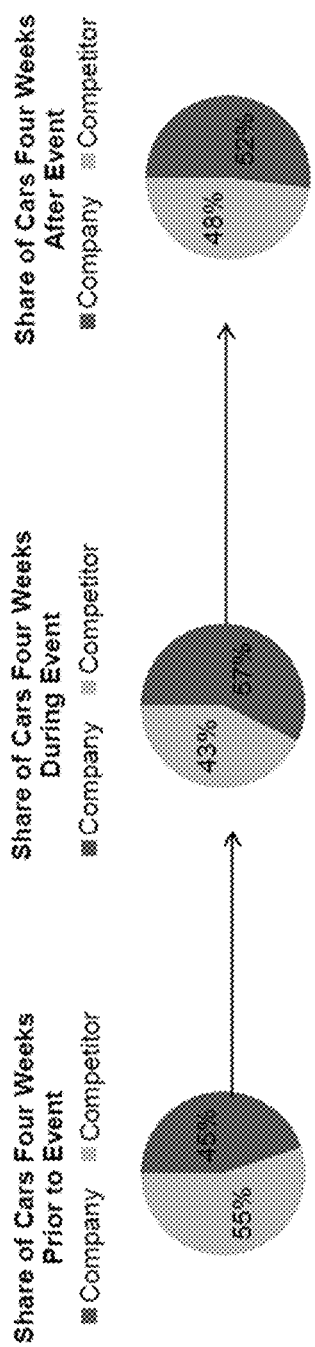
FIG. 4C illustrates a certain embodiment of components of a report according to the present invention.
Figure 4D:
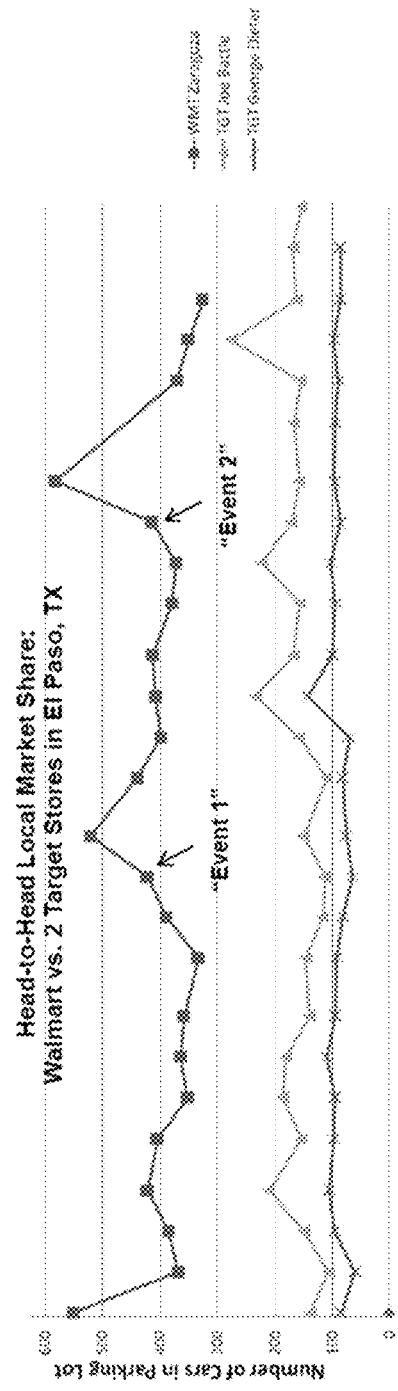
FIG. 4D illustrates a certain embodiment of components of a report according to the present invention.

FIG. 3E illustrates a specific embodiment of a component of a report 350. The component of the report 350 is another example of specific statistics 352, 354 associated with particular subtopics of interest 356, FIG. 4A-FIG. 4D illustrate other embodiments of reports or components of reports that may be generated through the use of the present invention. The illustrated reports are displayed as graphical representations of information related to specific topics determined by the user input. FIG. 4A illustrates a specific embodiment of components of a report 400, as graphically displayed to show specific statistics associated with particular subtopics of interest. FIG. 4B illustrates a specific embodiment of components of a report 410, and provides specific statistics associated with particular subtopics of interest. FIG. 4C illustrates a specific embodiment of components of a report 420, and provides specific statistics associated with particular subtopics of interest. FIG. 4D illustrates a specific embodiment of components of a report 430, and provides specific statistics associated with particular subtopics of interest.

FIG. 5A-FIG. 5D illustrate some of the representations of the certain content information that may be obtained for further evaluation.

FIG. 5A illustrates an example of a representation in which content information may be obtained 500. FIG. 5B illustrates an example of a representation in which content information may be obtained 510. FIG. 5C illustrates an example of a representation in which content information may be obtained 520. FIG. 5D illustrates an example of a representation in which content information may be obtained 530.

FIG. 6A-6E illustrates example embodiments of reports or components of reports that may be generated through the use of the present invention. The illustrations show displays of a combination of representations and statistical information related to specific topics and subtopics determined by the user input.

Figure 6A:
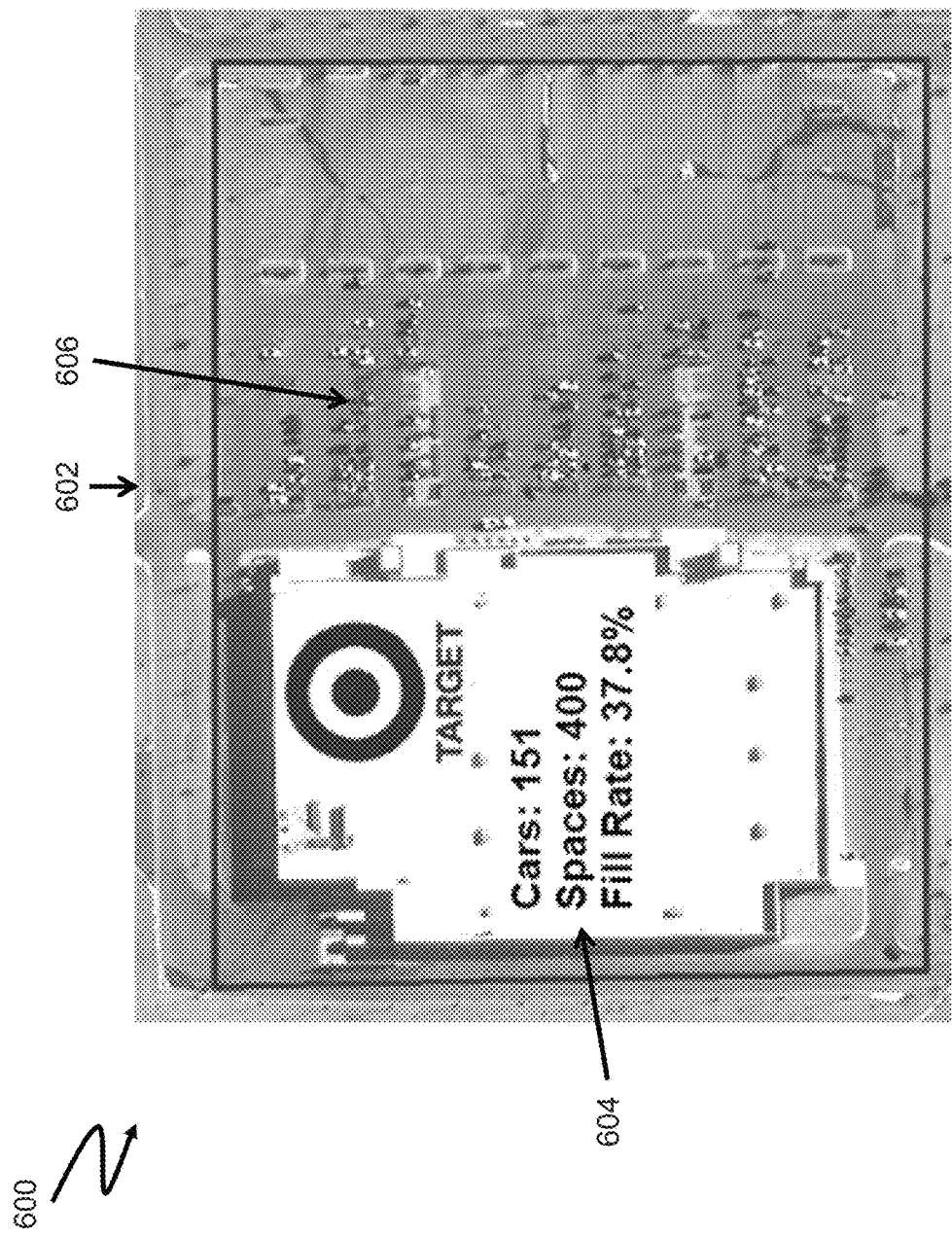
FIG. 6A illustrates a certain embodiment of a report or component of a report, as displayed as a combination of a representation and statistical information related to specific topics determined by the user input.

FIG. 6A illustrates an example embodiment of a report or component of a report 600, as displayed as a combination of a representation 602 and statistical information 604 related to specific topics and subtopics determined by the user input. In the report 600, specific component information is marked 606.

Figure 6B:
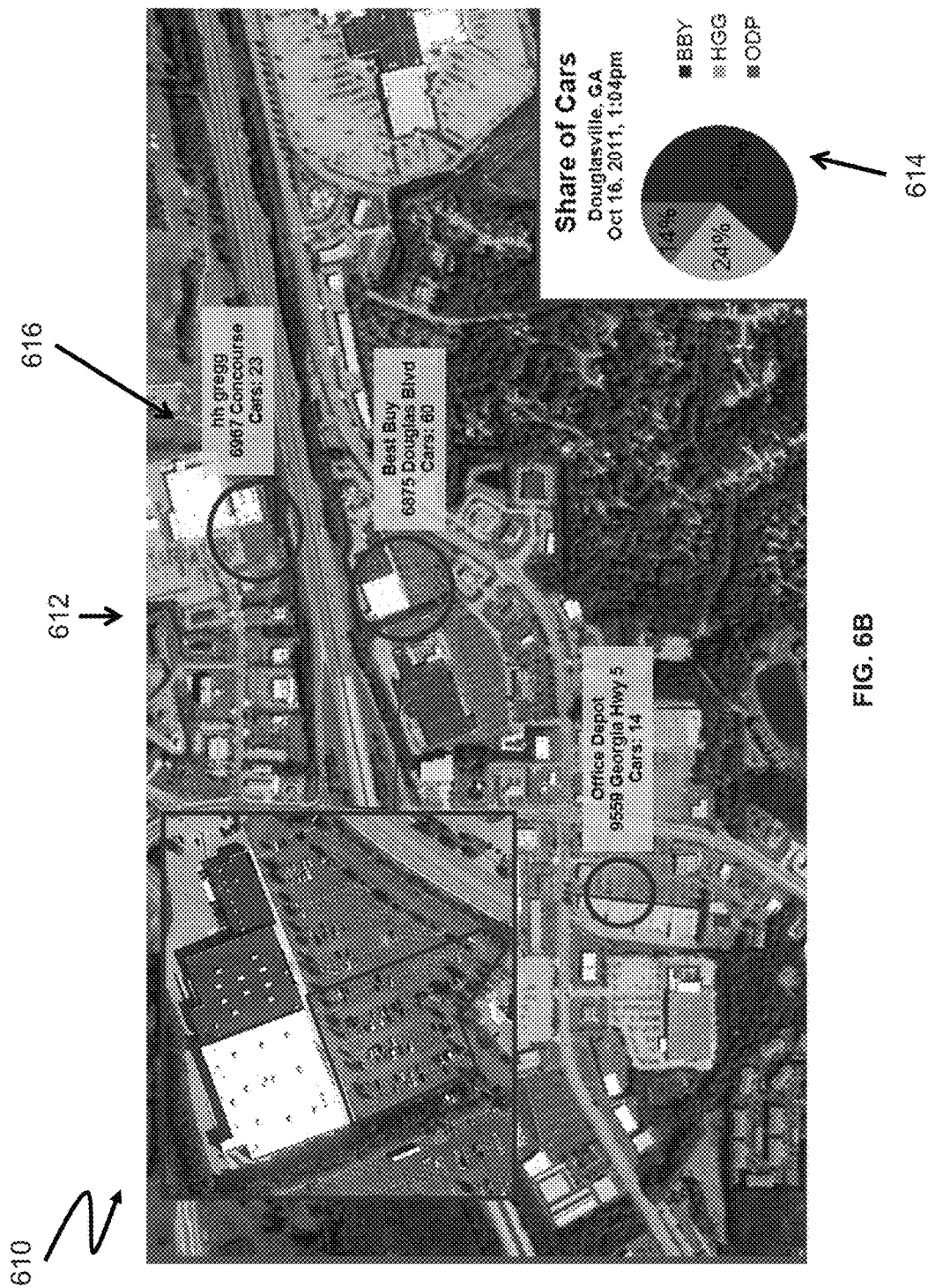
FIG. 6B illustrates a certain embodiment of a report or component of a report, as displayed as a combination of a representation and statistical information related to specific topics determined by the user input.

FIG. 6B illustrates an example embodiment of a report or component of a report 610, as displayed as a combination of a representation 612 and statistical information 614 related to specific topics and subtopics determined by the user input. In the report 610, specific component information is marked 616.

Figure 6C:
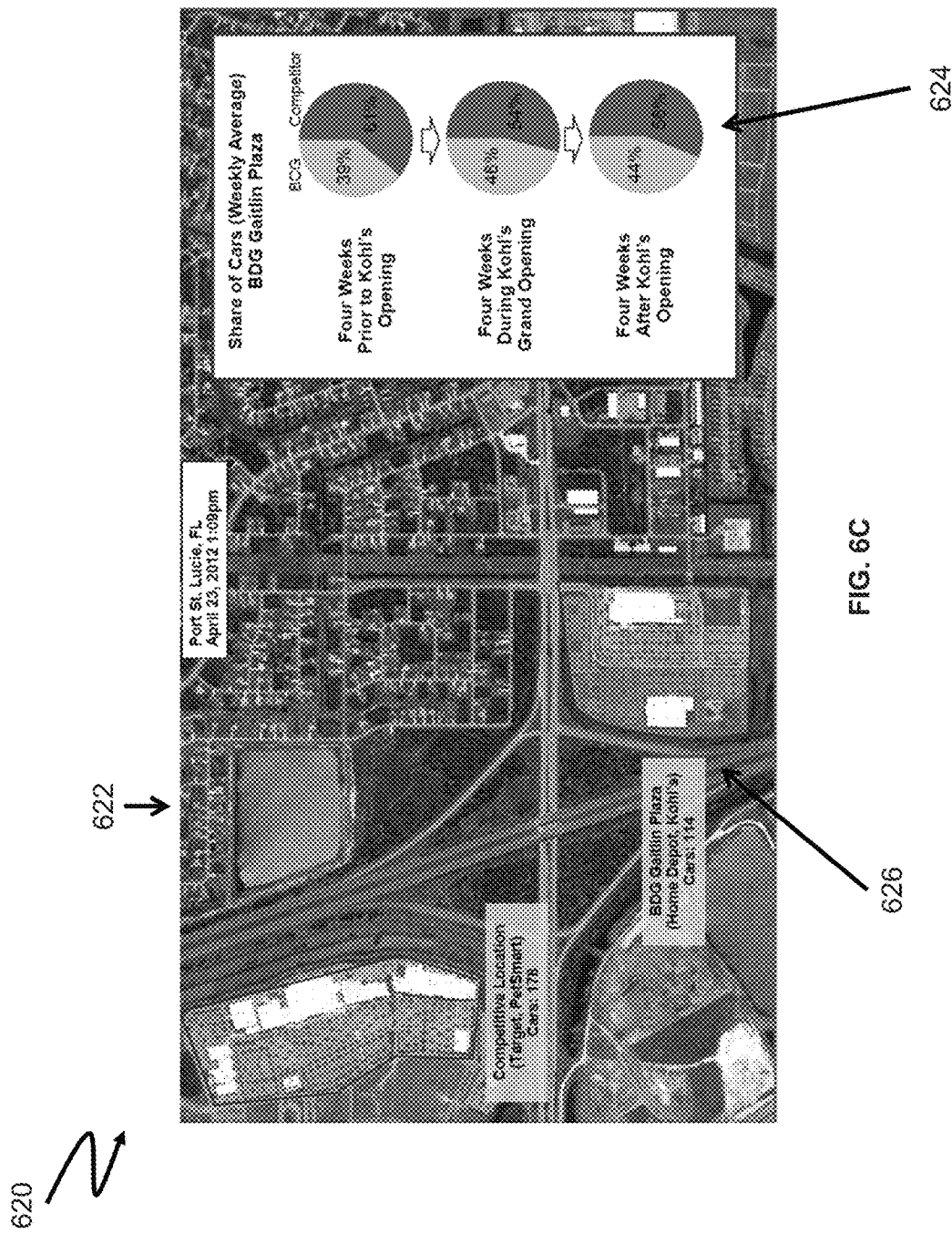
FIG. 6C illustrates a certain embodiment of a report or component of a report, as displayed as a combination of a representation and statistical information related to specific topics determined by the user input.

FIG. 6C illustrates an example embodiment of a report or component of a report 620, as displayed as a combination of a representation 622 and statistical information 624 related to specific topics and subtopics determined by the user input. In the report 620, specific component information is marked 626.

Figure 6D:
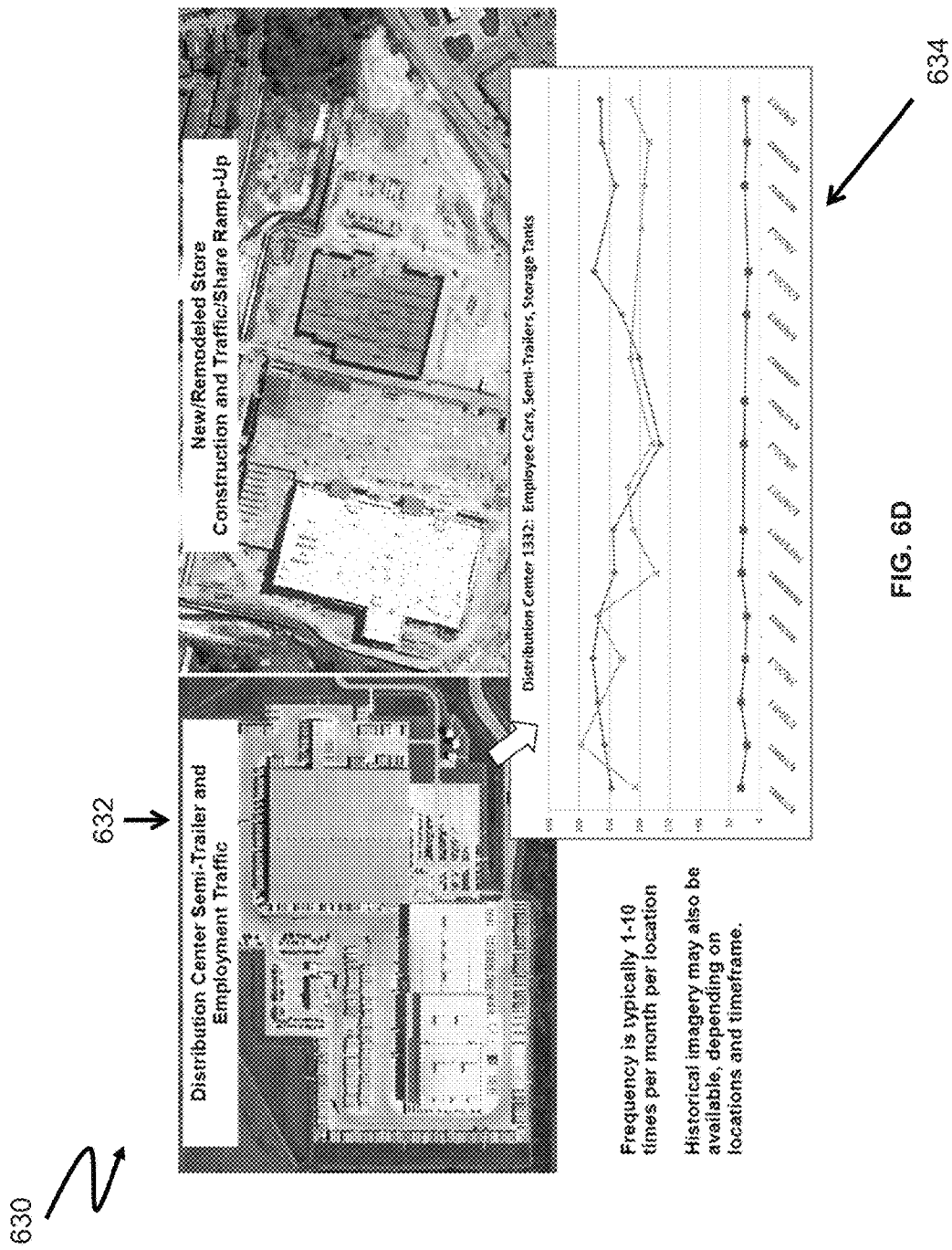
FIG. 6D illustrates a certain embodiment of a report or component of a report, as displayed as a combination of a representation and statistical information related to specific topics determined by the user input.

FIG. 6D illustrates an example embodiment of a report or component of a report 630, as displayed as a combination of a representation 632 and statistical information 634 related to specific topics and subtopics determined by the user input.

Figure 6E:
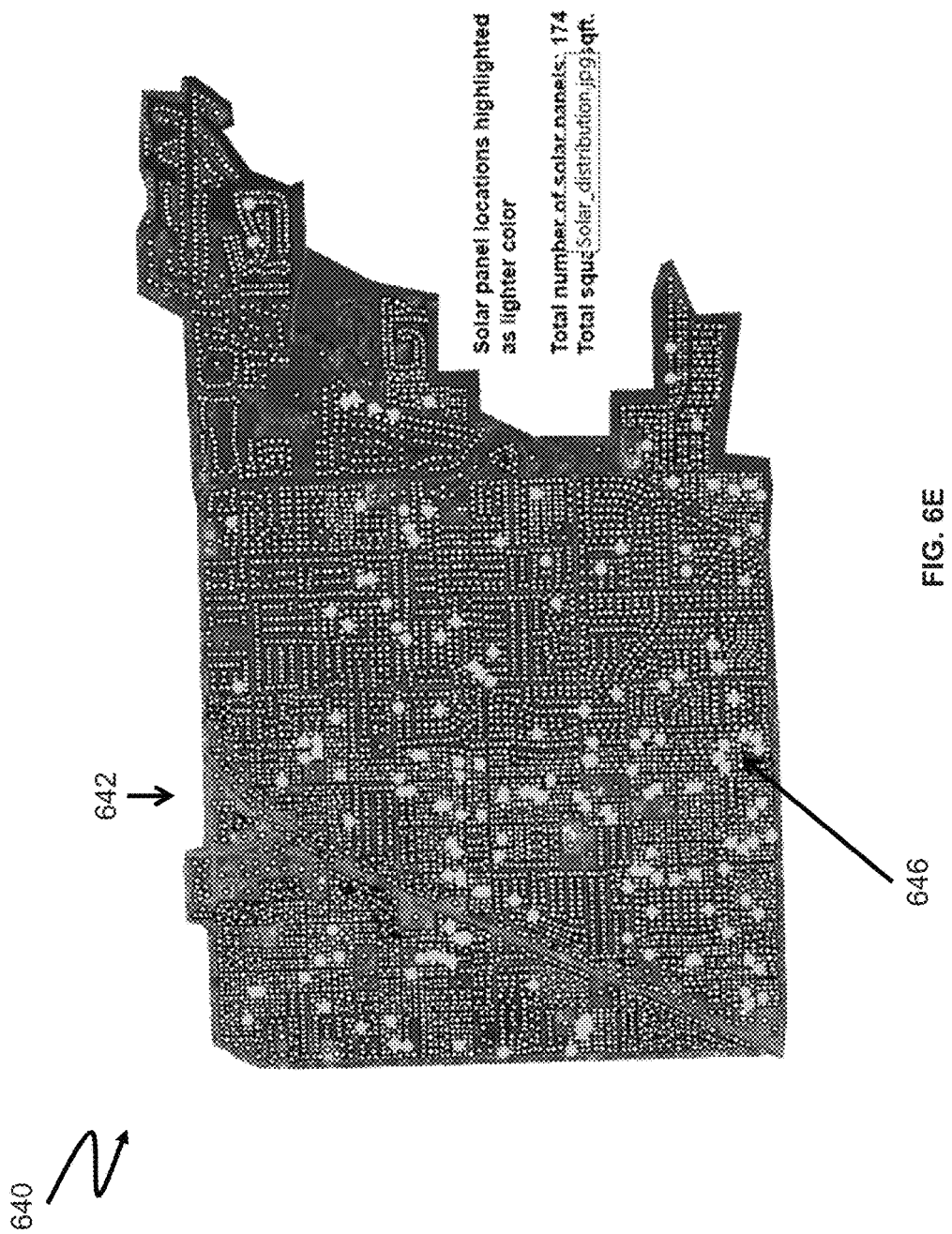
FIG. 6E illustrates a certain embodiment of a report or component of a report, as displayed as a combination of a representation and statistical information related to specific topics determined by the user input.

FIG. 6E illustrates an example embodiment of a report or component of a report 640, as displayed as a representation 642 with specific component information marked 626.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A computer system for determining an economic performance of a business location comprising the steps of:
   a recording device capturing one or more visual recordings of a parking lot of the business location;
   a processor in communication with the recording device, the processor including instructions that when executed cause the processor to:
   receive the one or more visual recordings and generate one or more representations from the one or more visual recordings;
   determine whether a threshold value of a selected criteria is met by each of the one or more representations, wherein the selected criteria is cloud cover;
   remove the one or more representations that do not meet the threshold value;
   extract content for evaluation from the one or more refined representations;
   refine content, wherein the content is refined using cloud cover criteria by overlaying coordinate units on the content to detect the coordinate units that intersect with the cloud cover criteria and removal of the content with the coordinate units that do not intersect with the cloud cover criteria;
   evaluate the content by counting a number of parking spaces in a parking lot of the business location;
   counting a number of vehicles in the parking lot of the business location; and
   dividing the number of vehicles in the parking lot by the number of parking spaces in the business location to obtain a traffic result, the traffic result comprising an estimate of economic activity of the business location; and
   a display, the display comprising a plurality of data screen configured to display the business location by a ticker name, the traffic result, and a time period to which the traffic result corresponds, the time period including a time slot during a day, a day of a week, one or more months, or one or more years.

2. The computer system for determining economic performance of a business location according to claim 1, wherein the traffic result includes one or more selected from the group comprising: a fill rate of a parking lot, a market share percentage of a particular business location in geographic location, a trend in business location revenues over time or over a geographic region, a value of sales of one or more business locations, a value of the share of vehicles over a specific time period, a close rate of vehicles in a parking lot of a business location versus actual transactions measured by the business location.

3. The computer system for determining economic performance of a business location according to claim 1, wherein the processor further compares two or more representations to obtain the traffic result.

4. The computer system for determining economic performance of a business location according to claim 1, wherein the recording device is one or more selected from the group comprising a camera, a satellite camera, an aerial mapping camera.

5. The computer system for determining economic performance of a business location according to claim 1, wherein the processor combines the traffic result with one or more second traffic results to obtain an index of traffic results.

6. The computer system for determining economic performance of a business location according to claim 1, wherein the processor weights the traffic result to correlate with the Bureau of Economic Analysis' Consumer Spending Index.

7. The computer system for determining economic performance of a business location according to claim 1, wherein the selected criteria further includes resolution and the processor determines whether the threshold value is met by each of the one or more representations and further removes the one or more representations that do not meet the threshold value.

8. The computer system for determining economic performance of a business location according to claim 7, wherein the one or more representations that have less than 0.95 panchromatic resolution are removed.

9. The computer system for determining economic performance of a business location according to claim 1, wherein the selected criteria further includes pixilation and the processor determines whether the threshold value is met by each of the one or more representations and further removes the one or more representations that do not meet the threshold value.

10. The computer system for determining economic performance of a business location according to claim 9, wherein the one or more representations that have less than 0.85 centimeters per pixel are removed.

11. The computer system for determining economic performance of a business location according to claim 1, wherein the one or more representations that have more than 95% cloud cover are removed.

12. The computer method for determine economic performance of a business location according to claim 1, wherein the business location is one or more of a manufacturing facility, a packaging facility, a retail store, a distribution center, a commuter transportation facility, a recycling facility, a construction site, or a power plant.

13. The computer method for determine economic performance of a business location according to claim 1, further comprising comparing the traffic result to a historical average of a traffic result of the time period to produce a comparison, and the comparison displayed on the display.

14. A computer method for determining an economic performance of a business location comprising the steps of:
capturing by a recording device one or more visual recordings of a geographic location, wherein the geographic location is a parking lot;
sending by the recording device to a processor the one or more visual recordings;
generating by the processor one or more representations from the one or more visual recordings;
refining by the processor the one or more representations based on one or more criteria;
extracting by the processor content for evaluation from the one or more refined representations;
evaluating by the processor the content to obtain a result, wherein the evaluating step further comprises the steps of:
converting the content into a first array;
calculating one or more statistics using the first array to produce a first array statistic;
splitting the first array statistic into an outlier array and a non-outlier array;
balancing the outlier array;
combining the balanced outlier array and the non-outlier array into a second array;
balanced the second array to produce a final statistic; and
displaying the final statistic on a display, wherein the final statistics comprises the economic performance of the business location.

15. The computer method for determining economic performance of a business location according to claim 14, wherein the evaluating step further comprises one or more steps selected from the group:
eliminating one or more outliers of the content, correcting over sampling or under sampling of the content, procuring an appropriate sample size of the content, removing randomly an imbalance of the content, weighting the content according to relevance.

16. The computer method for determining economic performance of a business location according to claim 15, wherein the statistical method is one selected from the group of: a quartile method, a z-score method, and a coarsened exact matching method.

17. A computer method for determining an economic performance of a business location comprising the steps of:
capturing by a recording device during a selected date range both a first visual recording of the business location and one or more second visual recordings of other business locations, each visual recording of a geographic location;
sending by the recording device to a processor the first visual recording and the one or more second visual recordings;
generating by the processor one or more representations from the first visual recording and the one or more second visual recordings;
refining by the processor the one or more representations based on one or more criteria;
extracting by the processor content for evaluation from the one or more refined representations;
evaluating by the processor the content to obtain a result, wherein the evaluating step further comprises the steps of:
counting by the processor a number of vehicles in a parking lot of the
business location;
counting by the processor a number of vehicles in a parking lot of each of the other business locations; and
dividing by the processor the number of vehicles of the business location by a sum of both the number of vehicles of the business location and the number of vehicles of each of the other business locations to determine a value; and
displaying the result on a display, wherein the result comprises the economic performance of the business location.

18. The computer method for determining economic performance of a business location according to claim 17, wherein the refining step further comprises the steps of:

determining whether a threshold value of a selected criteria is met by each of the one or more representations, wherein the selected criteria is one or more selected from the group comprising resolution, pixilation, cloud cover; and removing the one or more representations that no not meet the threshold value.

19. The computer method for determining economic performance of business location according to claim 17, wherein the recording device is one or more selected from the group comprising a camera, a satellite camera, an aerial mapping camera.

20. The computer method for determining economic performance of a business location according to claim 17, wherein the one or more representations includes renderable metadata comprising a time and a date of the capturing step.

* * * * *